(12) United States Patent
Sudmalis et al.

(10) Patent No.: US 8,424,435 B2
(45) Date of Patent: Apr. 23, 2013

(54) SHEET TRIMMER WITH INDICATOR TO DISPLAY USABLE LIFE STATUS OF BLADE OR BLADE OPPOSING MEMBER

(75) Inventors: Roland Sudmalis, Chicago, IL (US);
Michael Parrish, Deer Park, IL (US);
Michael Rellinger, Chicago, IL (US);
Jeff Kennedy, Algonquin, IL (US)

(73) Assignee: ACCO Brands USA LLC, Lincolnshire, IL (US)

( * ) Notice: Subject to any disclaimer, the term of this patent is extended or adjusted under 35 U.S.C. 154(b) by 1313 days.

(21) Appl. No.: 12/100,932

(22) Filed: Apr. 10, 2008

(65) Prior Publication Data

US 2008/0250909 A1 Oct. 16, 2008

Related U.S. Application Data

(60) Provisional application No. 60/910,889, filed on Apr. 10, 2007, provisional application No. 61/019,973, filed on Jan. 9, 2008.

(51) Int. Cl.
*B26D 1/18* (2006.01)
*B26D 7/27* (2006.01)
*B26D 7/28* (2006.01)

(52) U.S. Cl.
USPC ......... 83/485; 83/508; 83/522.27; 83/522.29; 83/578; 83/614

(58) Field of Classification Search .............. 83/54, 614, 83/955, 62, 62.1, 69, 72, 455, 471, 471.2, 83/477.2, 481, 483, 485, 487–489, 491, 508, 83/522.11, 522.27, 522.29, 578
See application file for complete search history.

(56) References Cited

U.S. PATENT DOCUMENTS

| 1,735,520 | A | 11/1929 | Williams |
| 2,378,249 | A | 6/1945 | Ruth |
| 2,444,723 | A | 7/1948 | Bowen |
| 2,790,498 | A | 4/1957 | Carscallen |
| 3,050,027 | A | 8/1962 | Borneman |

(Continued)

FOREIGN PATENT DOCUMENTS

| CN | 2880421 | 3/2007 |
| EP | 0780198 | 6/1997 |

(Continued)

OTHER PUBLICATIONS

Partial Search Report Form PCT/ISA/206 Communication Relating To The Results Of The Partial International Search for International Application No. PCT/US2008/059923.

(Continued)

*Primary Examiner* — Clark F. Dexter
(74) *Attorney, Agent, or Firm* — Michael Best & Friedrich LLP

(57) ABSTRACT

A trimmer that is operable to cut at least one sheet of paper includes a base configured to support the at least one sheet, a rail extending across at least a portion of the base, and a cutting assembly having a carriage slidably coupled to the rail and a blade positioned on the carriage. The trimmer also includes a blade opposing member coupled to the base adjacent to the rail and an indicator operable to display a usable life status of at least one of the blade and the blade opposing member.

22 Claims, 31 Drawing Sheets

U.S. PATENT DOCUMENTS

| | | | |
|---|---|---|---|
| 3,077,805 A | | 2/1963 | Stanley |
| 3,292,477 A | | 12/1966 | Raftery |
| 3,410,994 A | | 11/1968 | Facto |
| 3,668,956 A | | 6/1972 | Whipple et al. |
| 3,722,335 A | | 3/1973 | Labonte et al. |
| 3,736,825 A | * | 6/1973 | Covell .......................... 83/174 |
| 3,834,262 A | | 9/1974 | Lapper |
| 3,845,676 A | | 11/1974 | Pierce |
| 3,987,694 A | | 10/1976 | Kaufman |
| 4,015,493 A | * | 4/1977 | Woolston ........................ 83/13 |
| 4,046,044 A | | 9/1977 | Paterson et al. |
| 4,133,233 A | * | 1/1979 | Pearl ............................... 83/56 |
| 4,156,382 A | | 5/1979 | Baker |
| 4,224,853 A | | 9/1980 | Ruotsalainen |
| 4,239,199 A | | 12/1980 | Miura |
| 4,270,428 A | | 6/1981 | Colberg |
| 4,316,323 A | * | 2/1982 | Kirk .............................. 30/124 |
| 4,356,747 A | | 11/1982 | Kjaer et al. |
| 4,412,381 A | * | 11/1983 | Kirk .............................. 30/124 |
| 4,450,627 A | * | 5/1984 | Morimoto ...................... 30/391 |
| 4,505,174 A | | 3/1985 | Carithers, Jr. |
| 4,554,853 A | | 11/1985 | Nitschmann et al. |
| 4,558,686 A | * | 12/1985 | Ono ............................ 125/13.01 |
| 4,607,552 A | * | 8/1986 | Siler ............................. 83/76.7 |
| 4,641,556 A | | 2/1987 | Vigneron et al. |
| 4,665,787 A | | 5/1987 | Arnold et al. |
| 4,769,747 A | | 9/1988 | Parrillo |
| 4,867,023 A | | 9/1989 | Kozyrski et al. |
| 4,871,156 A | | 10/1989 | Kozyrski et al. |
| 4,886,009 A | | 12/1989 | Gondar et al. |
| 4,967,628 A | | 11/1990 | Judd et al. |
| 5,069,097 A | | 12/1991 | Mori |
| 5,079,981 A | * | 1/1992 | Singer et al. ...................... 83/72 |
| 5,152,105 A | * | 10/1992 | Belvederi ........................ 451/8 |
| 5,287,783 A | | 2/1994 | Mori |
| 5,303,574 A | | 4/1994 | Matossian et al. |
| 5,307,716 A | | 5/1994 | Onishi et al. |
| 5,485,391 A | | 1/1996 | Lindstrom |
| 5,488,886 A | | 2/1996 | Mohr |
| 5,671,647 A | | 9/1997 | Mori |
| 5,790,402 A | | 8/1998 | Liebermann et al. |
| 5,802,942 A | | 9/1998 | Cornell et al. |
| 5,996,459 A | | 12/1999 | Cornell et al. |
| 6,035,755 A | | 3/2000 | Mori |
| 6,079,307 A | | 6/2000 | Mori |
| 6,098,515 A | | 8/2000 | Daley, Jr. |
| 6,138,546 A | | 10/2000 | Hursey |
| 6,145,425 A | | 11/2000 | Bonnar et al. |
| 6,152,619 A | * | 11/2000 | Silverbrook ..................... 400/88 |
| 6,152,803 A | * | 11/2000 | Boucher et al. ................. 451/12 |
| 6,167,833 B1 | | 1/2001 | Caraway et al. |
| 6,182,549 B1 | | 2/2001 | Albright et al. |
| 6,240,823 B1 | | 6/2001 | Judge |
| 6,250,295 B1 | | 6/2001 | Chanton et al. |
| 6,354,909 B1 | * | 3/2002 | Boucher et al. ................. 451/12 |
| 6,591,157 B1 | | 7/2003 | Vivirito et al. |
| 6,644,158 B2 | | 11/2003 | Cleave et al. |
| 6,659,843 B2 | * | 12/2003 | Boucher et al. ................. 451/12 |
| 6,742,428 B2 | | 6/2004 | Lemens et al. |
| 6,776,077 B1 | | 8/2004 | Chen |
| 6,807,886 B1 | * | 10/2004 | Rasper et al. ................... 82/100 |
| 6,807,888 B1 | * | 10/2004 | Kiyohara et al. ............... 83/485 |
| 6,817,102 B2 | | 11/2004 | Harris et al. |
| 6,990,884 B2 | * | 1/2006 | Tseng ............................. 83/618 |
| 7,010,386 B2 | | 3/2006 | McDonnell et al. |
| 7,011,008 B2 | | 3/2006 | McLean et al. |
| 7,021,872 B2 | | 4/2006 | Hauptmann et al. |
| 7,040,208 B2 | | 5/2006 | Mori et al. |
| 7,044,042 B2 | | 5/2006 | Schultz et al. |
| 7,124,670 B2 | | 10/2006 | Tanaka et al. |
| 7,131,363 B2 | | 11/2006 | Tseng |
| 7,258,418 B2 | * | 8/2007 | Silverbrook ..................... 347/29 |
| 7,484,444 B2 | * | 2/2009 | Tokumitsu ..................... 83/62.1 |
| 7,572,000 B2 | * | 8/2009 | Silverbrook ................... 347/104 |
| 7,854,504 B2 | * | 12/2010 | Silverbrook ................... 347/109 |
| 2002/0193049 A1 | * | 12/2002 | Boucher et al. ................. 451/12 |
| 2003/0094125 A1 | | 5/2003 | Hsueh |
| 2003/0140757 A1 | | 7/2003 | Carlson et al. |
| 2003/0183051 A1 | | 10/2003 | Rankin, Sr. |
| 2004/0112360 A1 | * | 6/2004 | Boucher et al. ............. 125/16.01 |
| 2004/0149108 A1 | | 8/2004 | McLean et al. |
| 2004/0216571 A1 | | 11/2004 | Schultz et al. |
| 2005/0166745 A1 | * | 8/2005 | Tokumitsu ....................... 83/884 |
| 2005/0199114 A1 | | 9/2005 | Tseng |
| 2005/0223863 A1 | | 10/2005 | Volfson et al. |
| 2005/0229756 A1 | | 10/2005 | Tanaka et al. |
| 2005/0284278 A1 | | 12/2005 | Shimizu et al. |
| 2006/0011040 A1 | | 1/2006 | Uchiyama et al. |
| 2006/0053994 A1 | | 3/2006 | Carrillo et al. |
| 2006/0090621 A1 | | 5/2006 | Shimizu |
| 2006/0117922 A1 | | 6/2006 | Causse et al. |
| 2006/0130626 A1 | | 6/2006 | Nishimura et al. |
| 2006/0201303 A1 | | 9/2006 | Tseng |
| 2006/0201986 A1 | * | 9/2006 | Sasaki et al. ................... 225/105 |
| 2006/0219078 A1 | | 10/2006 | Parrish et al. |
| 2006/0260455 A1 | | 11/2006 | Yeghiayan et al. |
| 2008/0134851 A1 | * | 6/2008 | Roach et al. ...................... 83/56 |
| 2008/0134857 A1 | * | 6/2008 | Roach ............................. 83/548 |
| 2009/0211421 A1 | * | 8/2009 | Lier et al. ................... 83/522.27 |

FOREIGN PATENT DOCUMENTS

| | | |
|---|---|---|
| EP | 0813935 | 12/1997 |
| EP | 1232841 | 8/2002 |
| EP | 1533088 | 5/2005 |
| GB | 1247681 | 9/1971 |
| GB | 2264667 | 9/1993 |
| JP | 2034191 | 2/1990 |

OTHER PUBLICATIONS

Westcott Rotary Trimmer, Item #13790, Purchased in Oct. 2006, 3 pages.

Manufacturer Unknown, Rotary Sheet Trimmer, sold before Apr. 10, 2007, 2 pages.

Carl, DC-210/220/238/250 Heavy-Duty Rotary Trimmers, Product Information, http://www.carl-products.com/Products/TrimmersCutters/DC210220238250.htm,visited Feb. 21, 2007, 3 pages.

EK Success, Straight-edge Trimmers, Product Information, http://www.eksuccess.com/products_list.php?sess_id=7a534269db6e9c30f12135cd07defd84, visited Feb. 5, 2007, 2 pages.

Uchida, Paper Trimming Buddy, item #RPT900, Product Information, www.uchida.com, visited Feb. 4, 2007, 2 pages.

International Search Report and Written Opinion dated Nov. 17, 2008 for PCT/US2008/059923.

* cited by examiner

SHEET TRIMMER WITH INDICATOR TO DISPLAY USABLE LIFE STATUS OF BLADE OR BLADE OPPOSING MEMBER

CROSS-REFERENCE TO RELATED APPLICATIONS

This application claims priority to U.S. Provisional Patent Application No. 60/910,889, filed Apr. 10, 2007, and U.S. Provisional Patent Application No. 61/019,973, filed Jan. 9, 2008, the entire contents of both of which are hereby incorporated by reference.

BACKGROUND

The present invention relates to a sheet trimmer.

Rotary or fixed blade (i.e., non-rotating blade) trimmers are used to cut a sheet or a stack of sheets of paper. Typically, trimmers include a cutting assembly mounted on a rail. A blade extends from the cutting assembly and is slid along the rail with the cutting assembly to cut the paper. In operation, a user positions and aligns the paper he or she wishes to cut beneath the rail and slides the cutting assembly along the rail, thereby cutting or trimming the paper as desired.

SUMMARY

In one embodiment, the invention provides a trimmer operable to cut at least one sheet of paper. The trimmer includes a base configured to support the at least one sheet, a rail extending across at least a portion of the base, and a cutting assembly having a carriage slidably coupled to the rail and a blade positioned on the carriage. The trimmer also includes a blade opposing member coupled to the base adjacent to the rail and an indicator operable to display a usable life status of at least one of the blade and the blade opposing member.

Other aspects of the invention will become apparent by consideration of the detailed description and accompanying drawings.

DETAILED DESCRIPTION

Figure 1:
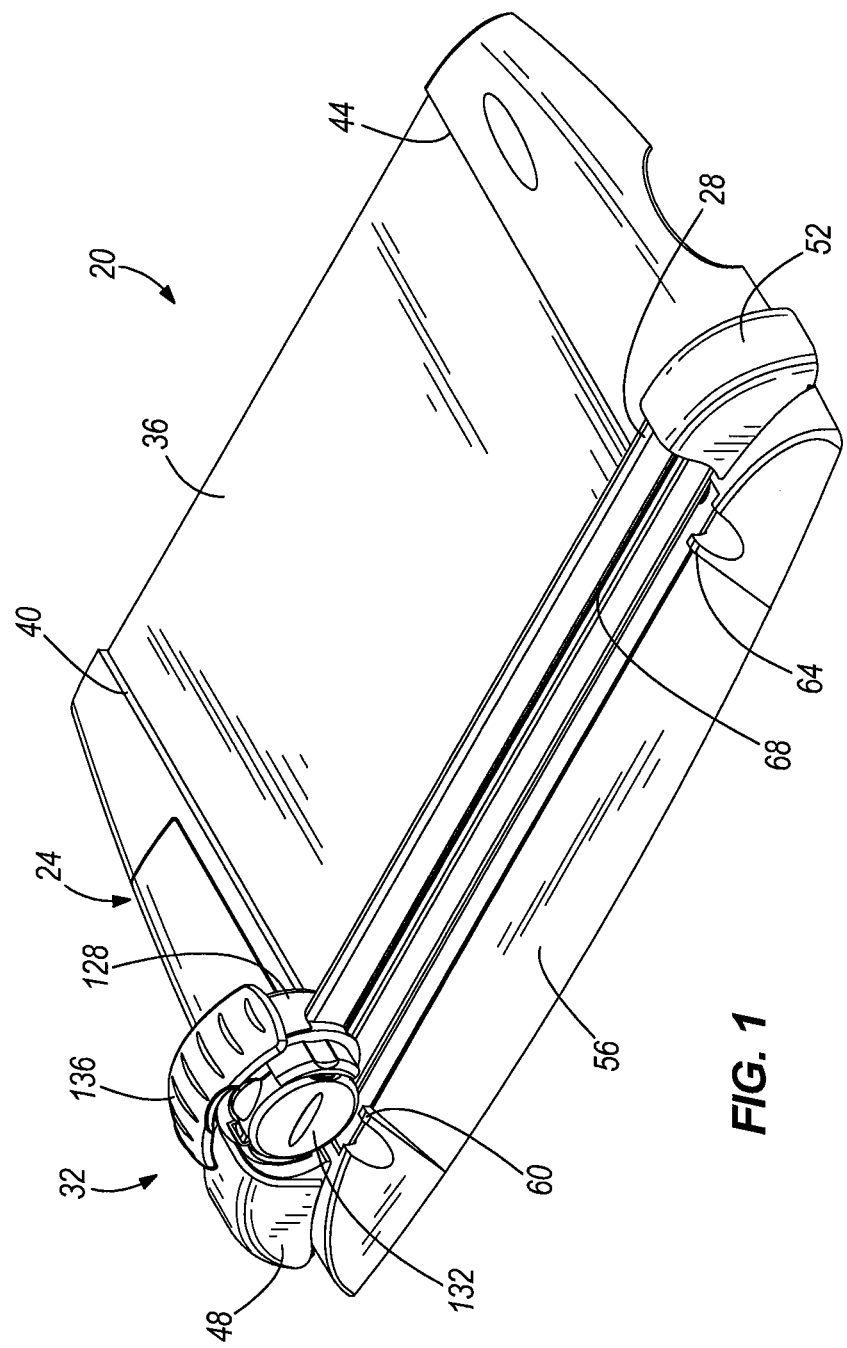
FIG. 1 is a front perspective view of a rotary trimmer embodying the present invention.
Figure 2:
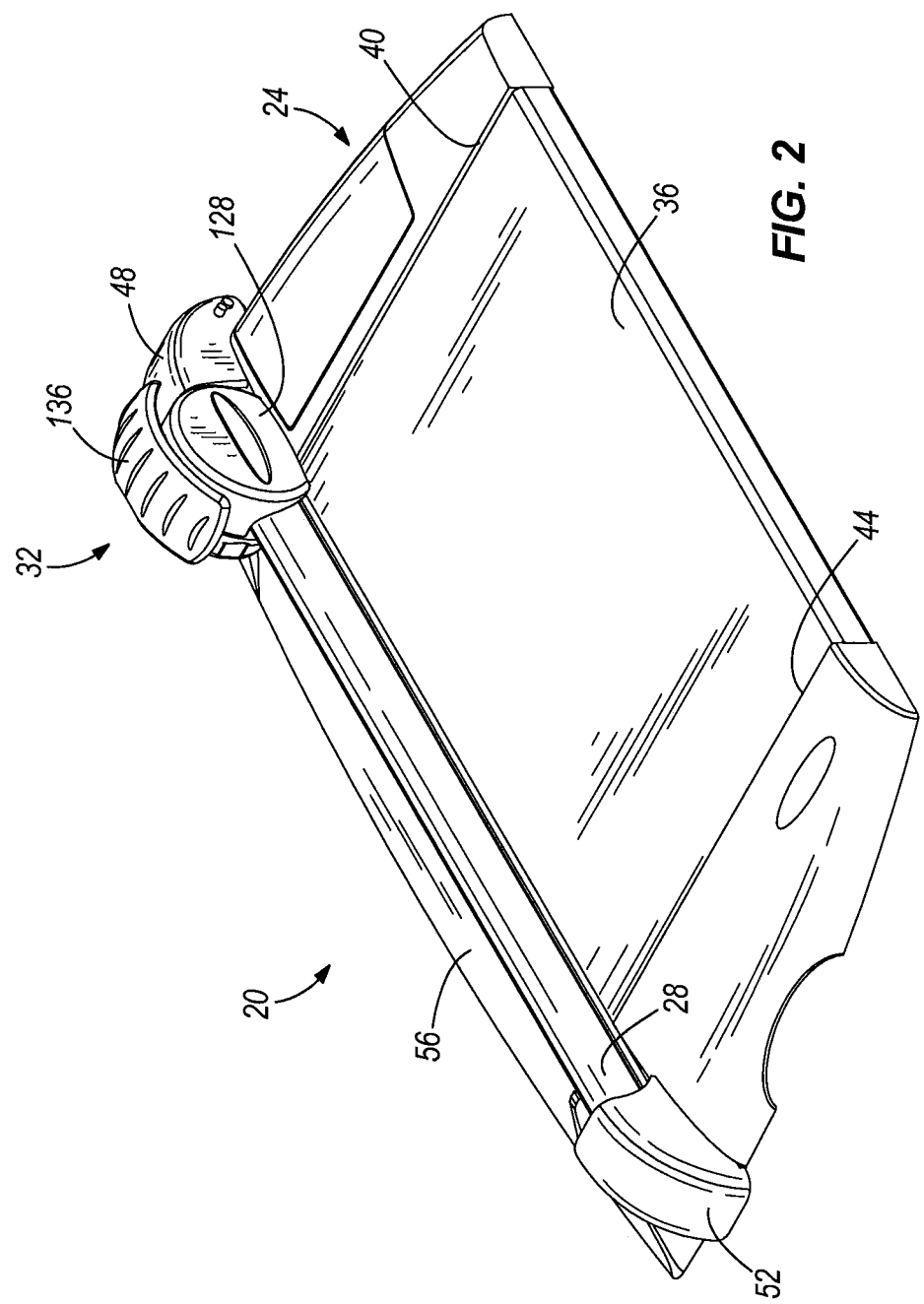
FIG. 2 is a rear perspective view of the rotary trimmer shown in FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

FIGS. 1-5 illustrate a rotary trimmer 20 of the present invention. Although the invention described herein is discussed with reference to a rotary trimmer, it should be readily apparent to one skilled in the art that elements and features of the invention may also be applied to fixed blade trimmers where the blade of the trimmer does not rotate. The rotary trimmer 20 includes a platform or base 24, a rail 28 coupled to the platform 24, and a cutting assembly 32 slidably mounted on the rail 28. The platform 24 includes a flat portion 36, a first guide 40, a second guide 44, a first rail support 48, a second rail support 52, and a sloped edge 56. The flat portion 36 supports a sheet or a stack of sheets of paper (e.g., lined paper, printer or copier paper, construction paper, cardstock, cardboard, etc.) during cutting. In some embodiments, the flat portion 36 may include markings (e.g., gridlines, writing, grooves, etc.) to indicate lengths and/or angles of cutting. The illustrated guides 40, 44 are in the form of shoulders formed on the platform 24 and are positioned on either side of the flat portion 36 to facilitate alignment of the paper on the platform 24.

The sloped edge 56 includes a first projection 60 and a second projection 64 positioned to guide a portion of the paper cut by the rotary trimmer 20. In the illustrated embodiment, the sloped edge 56 is a straight slant so that the end of the sloped edge 56 further from the rail 28 is relatively lower than the end of the sloped edge 56 closer to the rail 28. In other embodiments, the sloped edge 56 may be curved or stepped. When the paper extends from the flat portion 36 and is cut, the sloped edge 56 allows the cut portion of the paper to bend or fall away from the cutting assembly 32.

Figure 3A:
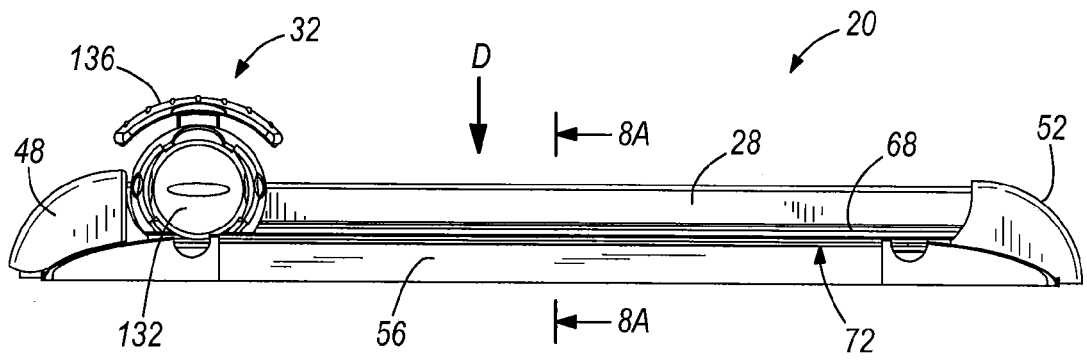
FIG. 3A is a front view of the rotary trimmer shown in FIG. 1 in a first position.

The rail 28 is coupled to the platform 24 between the first rail support 48 and the second rail support 52 and is positioned near the end of the flat portion 36 and the beginning of the sloped edge 56. The rail 28 includes an outwardly extending track portion 68 to facilitate mounting and alignment of the cutting assembly 32 on the track portion 68. As shown in FIG. 3A, the rail 28 is supported slightly above the platform 24 such that a gap 72 exists between the platform 24 and the rail 28. The gap 72 allows the paper to slide between the platform 24 and the rail 28 during insertion, alignment, and cutting.

Figure 3B:
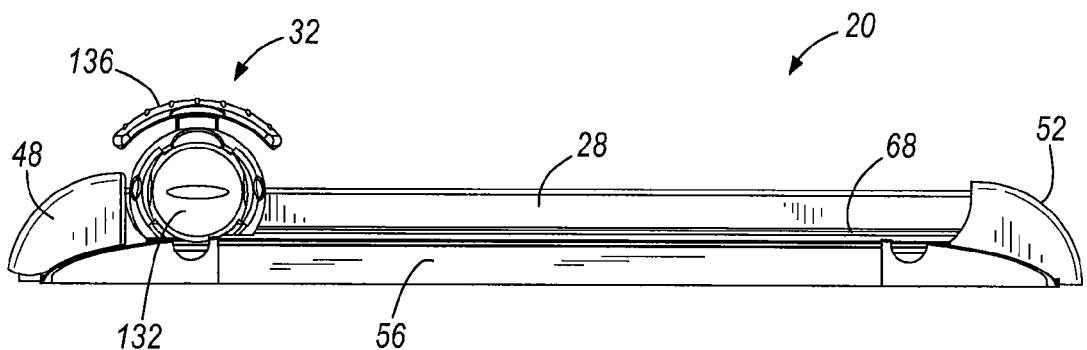
FIG. 3B is a front view of the rotary trimmer shown in FIG. 1 in a second position.
Figure 4:
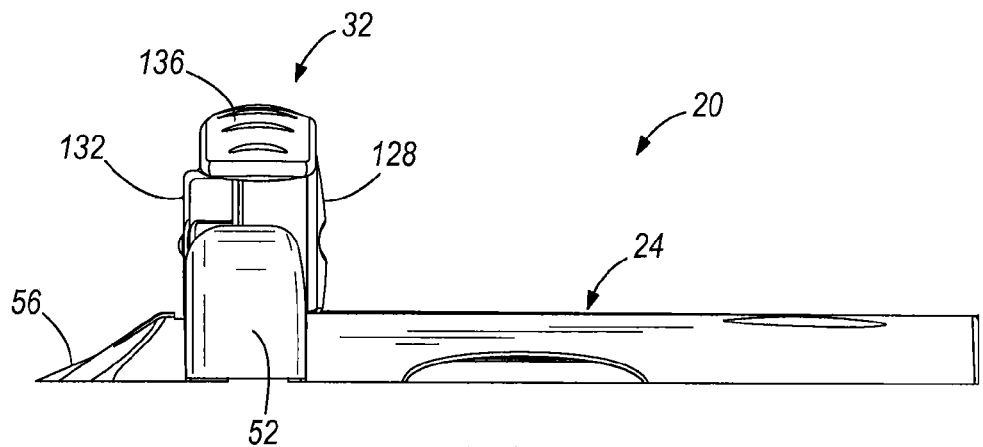
FIG. 4 is a side view of the rotary trimmer shown in FIG. 1.
Figure 5:
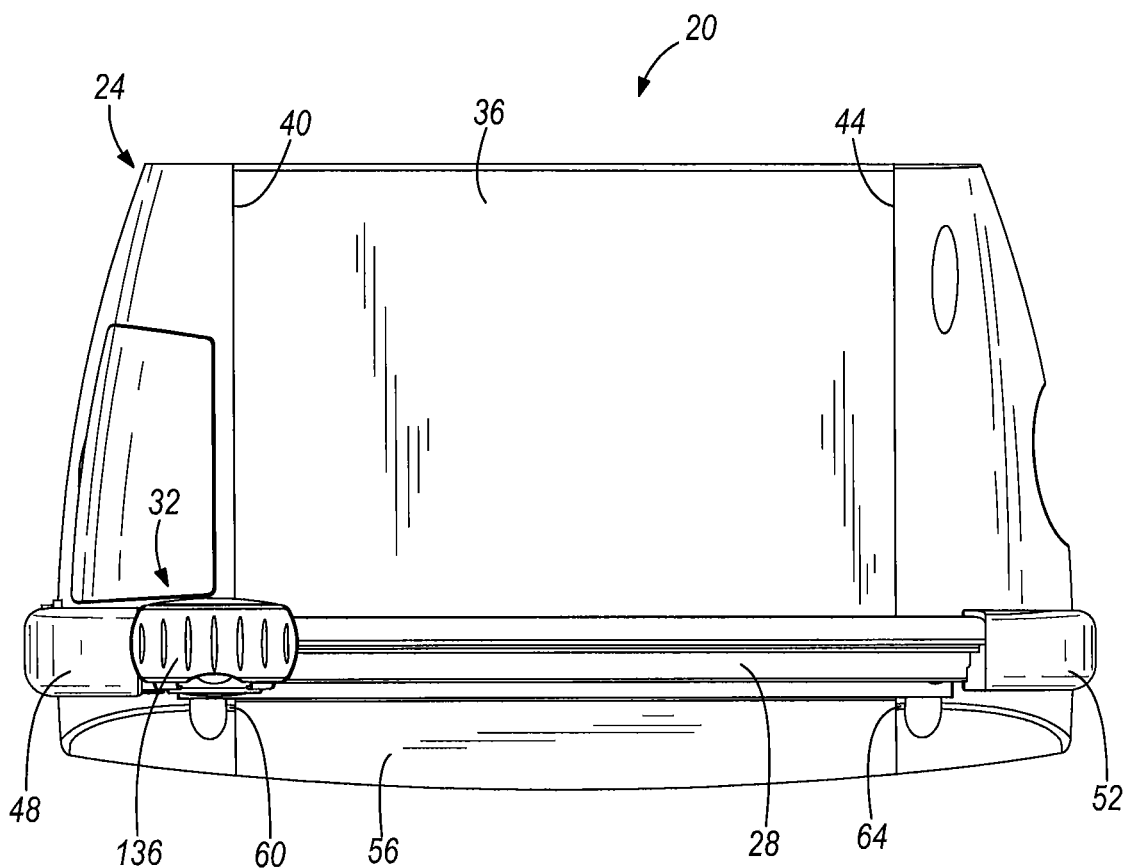
FIG. 5 is a top view of the rotary trimmer shown in FIG. 1.
Figure 6:
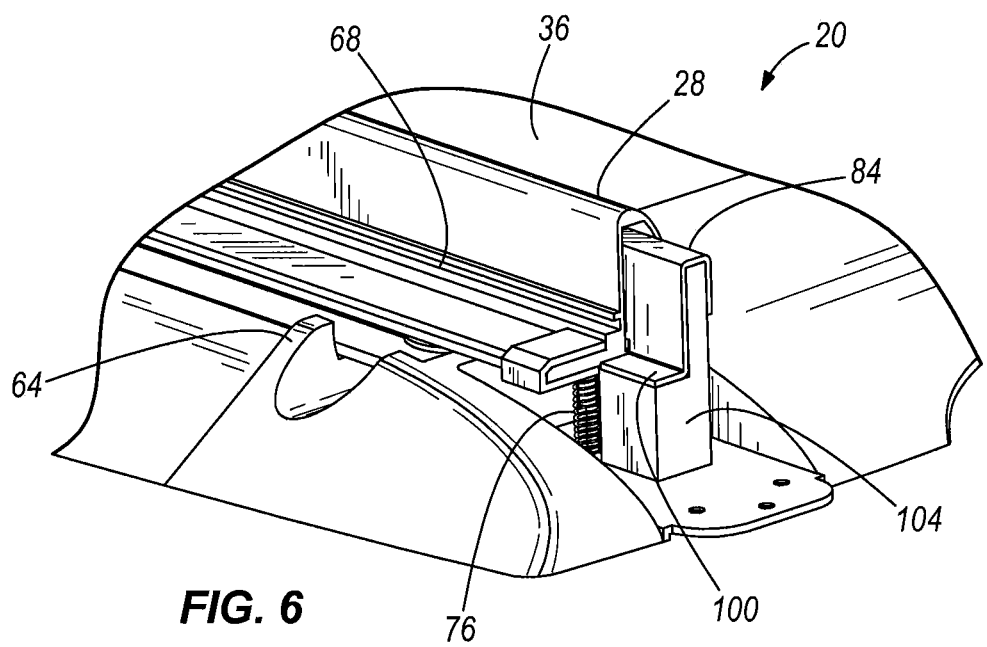
FIG. 6 is an enlarged perspective view of a portion of the rotary trimmer shown in FIG. 1.
Figure 7A:
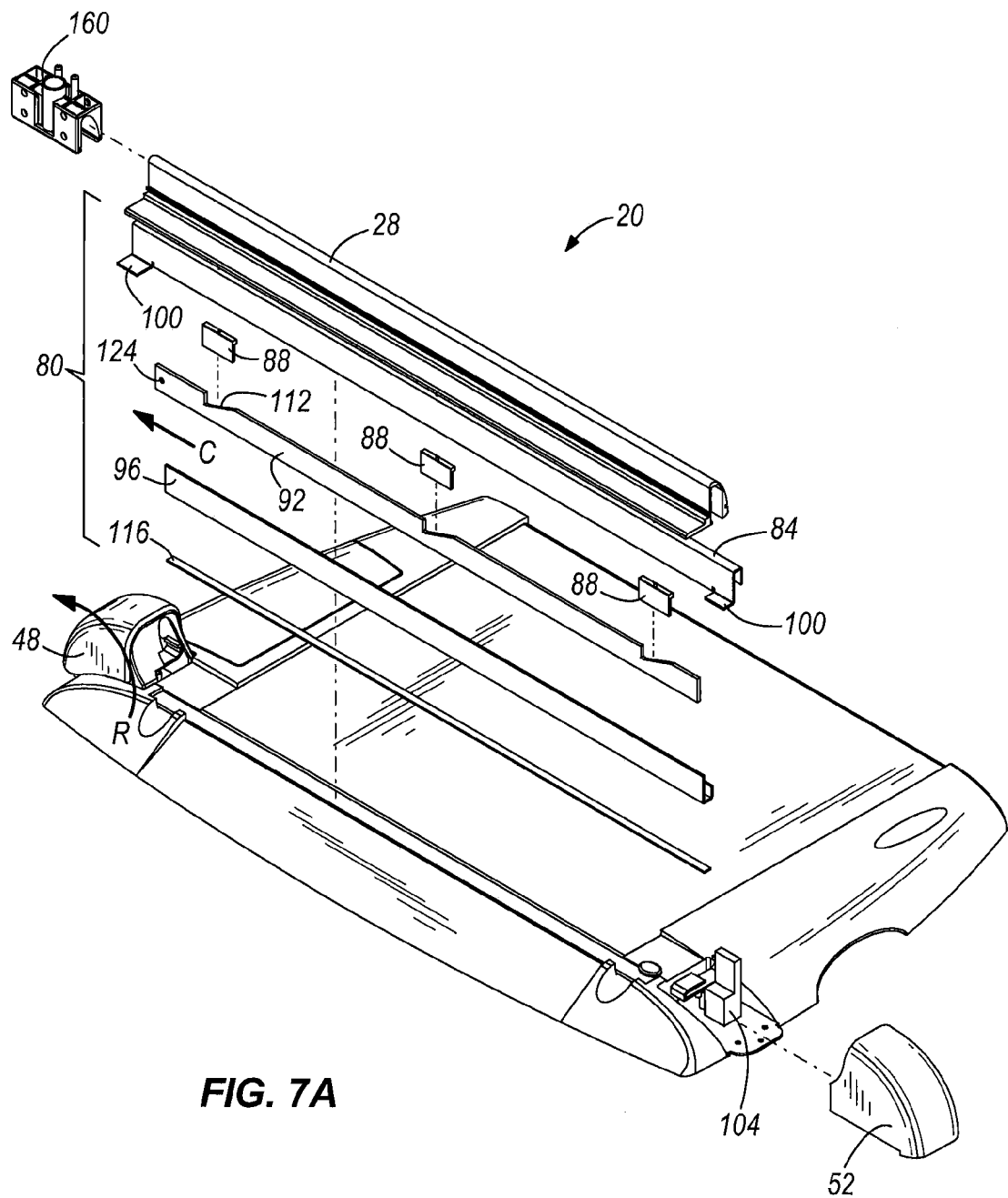
FIG. 7A is an exploded front perspective view of a rail and a clamp assembly of the rotary trimmer shown in FIG. 1.
Figure 7B:
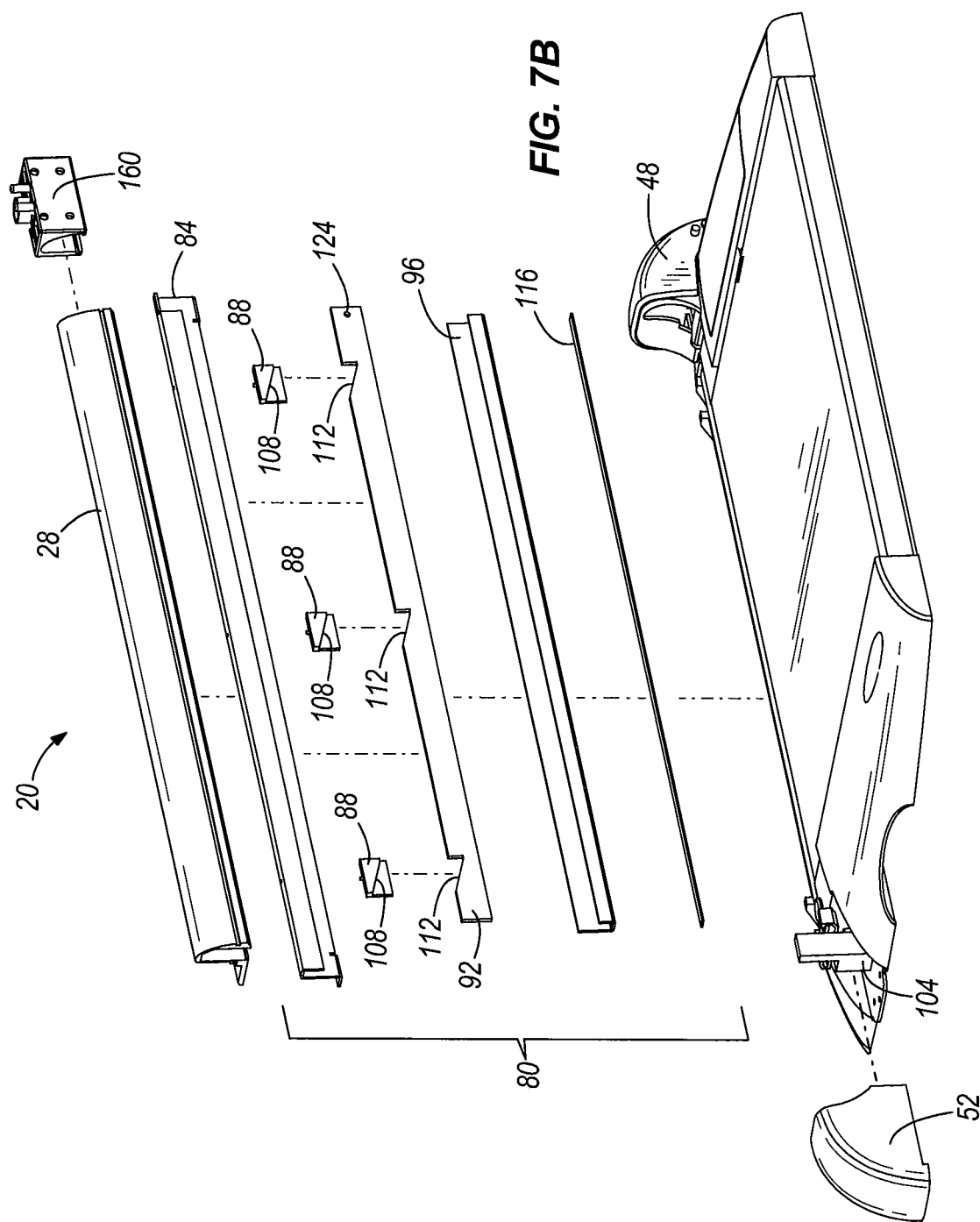
FIG. 7B is an exploded rear perspective view of the rail and the clamp assembly shown in FIG. 7A.
Figure 8A:
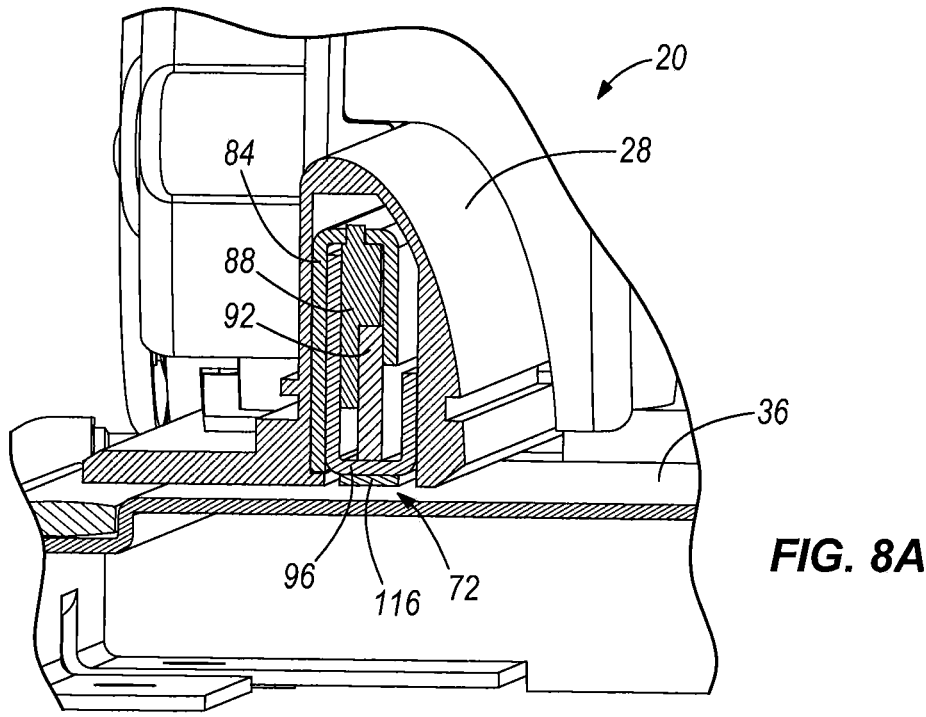
FIG. 8A is a cross-sectional view of the rail and the clamp assembly in the first position, taken through section line 8A-8A of FIG. 3A.
Figure 8B:
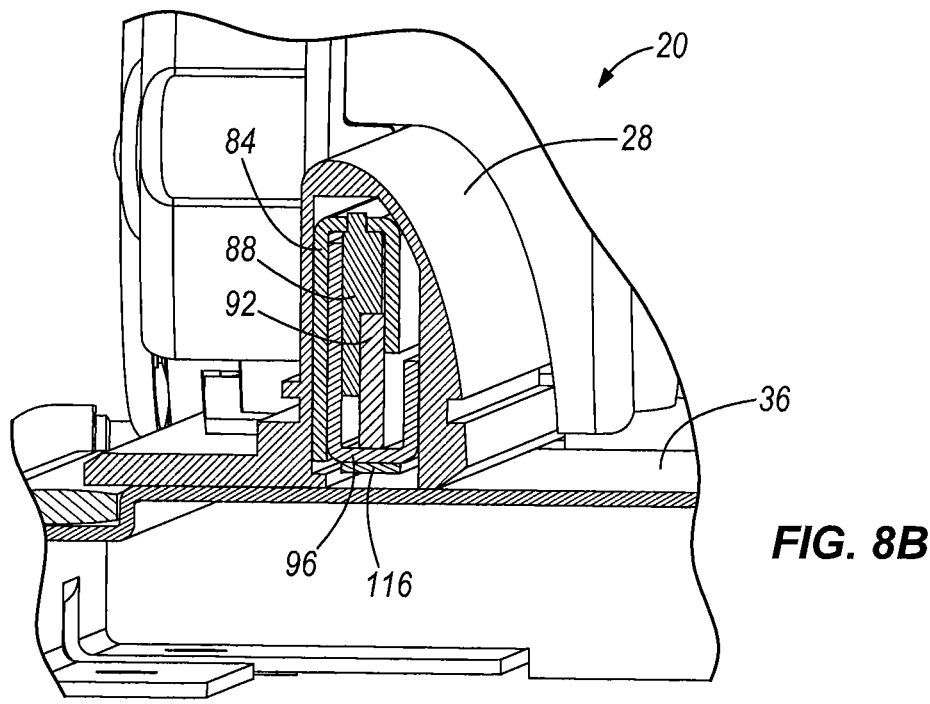
FIG. 8B is a cross-sectional view of the rail and the clamp assembly shown in FIG. 8A in the second position.

In the illustrated embodiment, the rail 28 is movable between a first position (FIGS. 3A and 8A) and a second position (FIGS. 3B and 8B). Pressing downwardly on the cutting assembly 32 and/or the rail 28 in the direction of arrow D automatically causes the rail 28 to move from the first position to the second position. A spring 76 (see FIG. 6) positioned on each end of the rail 28 between the platform 24 and the rail 28 biases the rail 28 to the first position. In the first position, the rail 28 is spaced apart from the platform 24 such that the gap 72 is larger. In the second position, the rail 28 is closer to the platform 24 such that the gap 72 is smaller or eliminated completely. Moving the rail 28 to the second position clamps paper between the rail 28 and the platform 24, reducing shifting and sliding of the paper on the platform 24. In the illustrated embodiment, using the rail 28 in this manner (i.e., an automatic clamping mode) to clamp the paper is effective for clamping approximately fifteen sheets of paper. In situations where it is desired to clamp more sheets of paper, the trimmer 20 may include a secondary clamp assembly.

As shown in FIGS. 7A-8D, the trimmer 20 includes a clamp assembly 80 positioned substantially within the rail 28. The illustrated clamp assembly 80 includes a clamp beam 84, three clamp wedges 88, a clamp ramp plate 92, and a clamp bar 96. The clamp beam 84 includes two feet 100 that rest on corresponding L-shaped supports 104 such that the clamp beam 84 is stationary relative to the platform 24. The clamp wedges 88 engage the clamp beam 84 such that the clamp wedges 88 are also stationary relative to the platform 24. In some embodiments, fewer or more clamp wedges 88 may be attached to the clamp beam 84. In the illustrated embodiment, each clamp wedge 88 includes an angled surface 108 and may be constructed of a Delrin® material (manufactured by DuPont of Wilmington, Del.).

The clamp ramp plate 92, or second clamping member, is positioned within the clamp beam 84 adjacent to the clamp wedges 88. The clamp ramp plate 92 includes three triangular notches 112 corresponding to the angled surfaces 108 of the three clamp wedges 88. In embodiments where fewer or more clamp wedges 88 are present, the number of triangular notches 112 may also be different to correspond with the number of clamp wedges 88. The clamp bar 96, or first clamping member, is positioned beneath the clamp ramp plate 92 and partially surrounds the clamp ramp plate 92. In some embodiments, such as the illustrated embodiment, a resilient strip 116 may be positioned on a bottom of the clamp bar 96 to facilitate gripping of the paper and to help take up slack during clamping. The resilient strip 116 may be composed of, for example, a foam material, a rubber material, and/or other resilient materials.

Figure 8C:
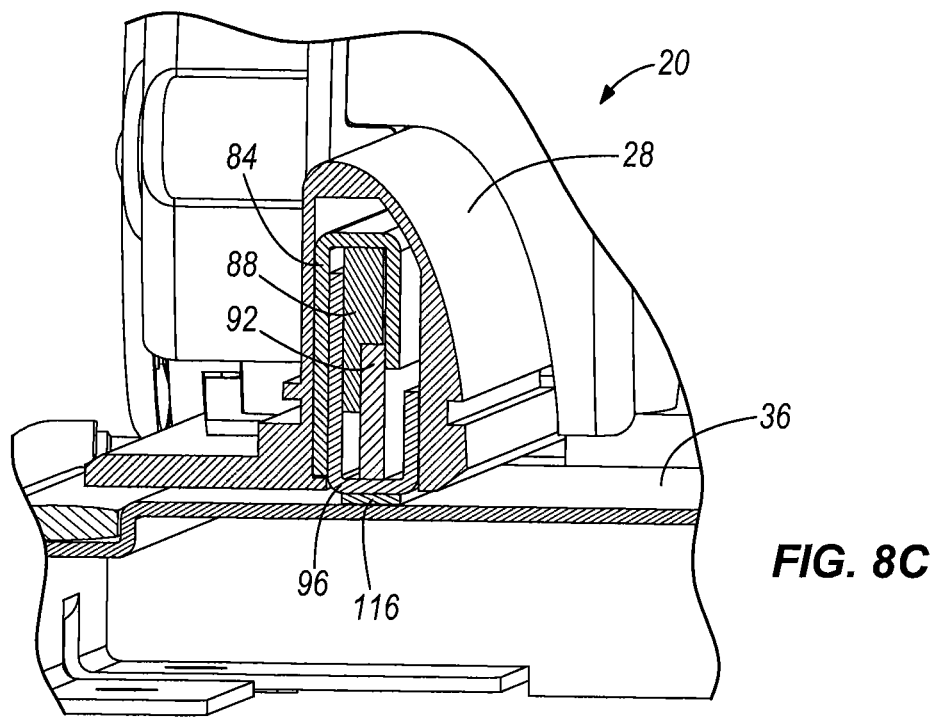
FIG. 8C is a cross-sectional view of the rail and the clamp assembly shown in FIG. 8A in a third position.
Figure 8D:
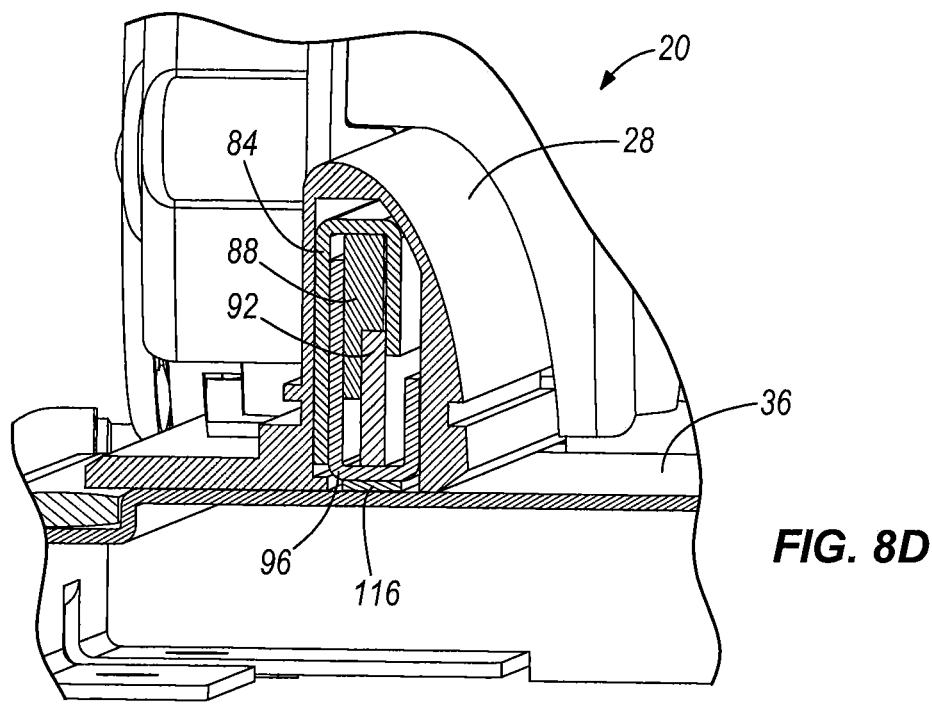
FIG. 8D is a cross-sectional view of the rail and the clamp assembly shown in FIG. 8A in a fourth position.
Figure 9:
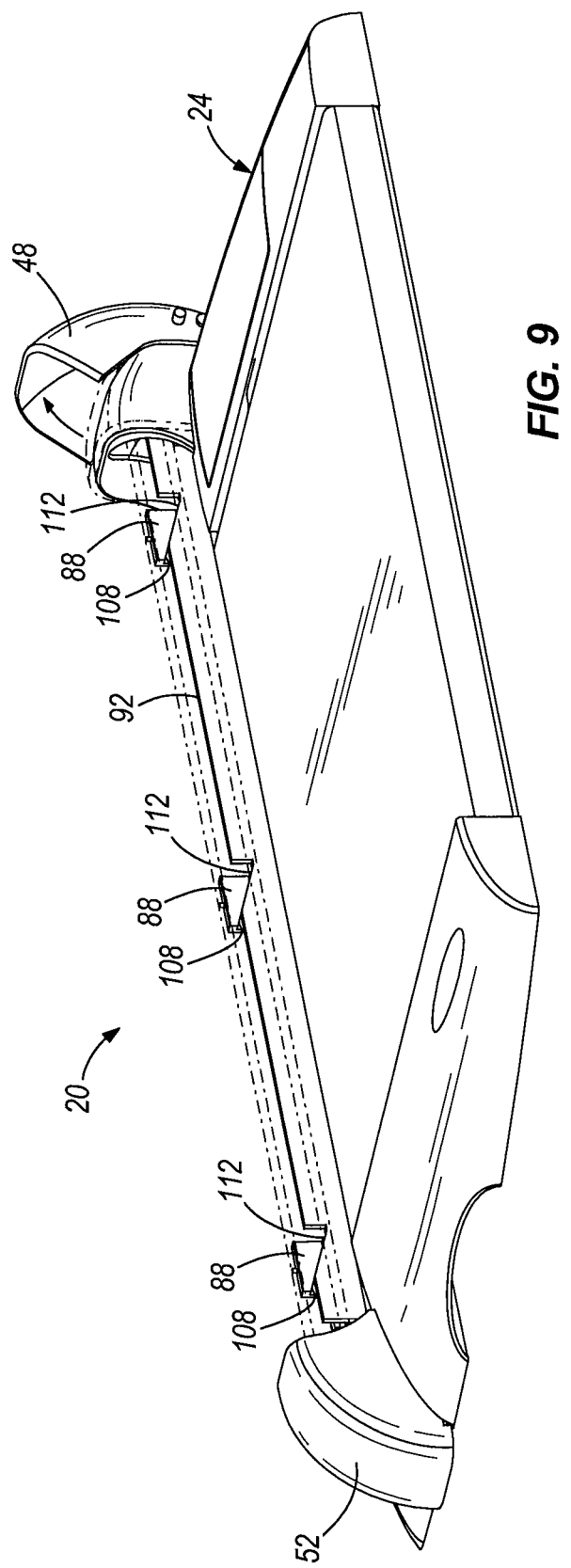
FIG. 9 is a rear perspective view, shown with the rail removed, of the clamp assembly in the third position.
Figure 10:
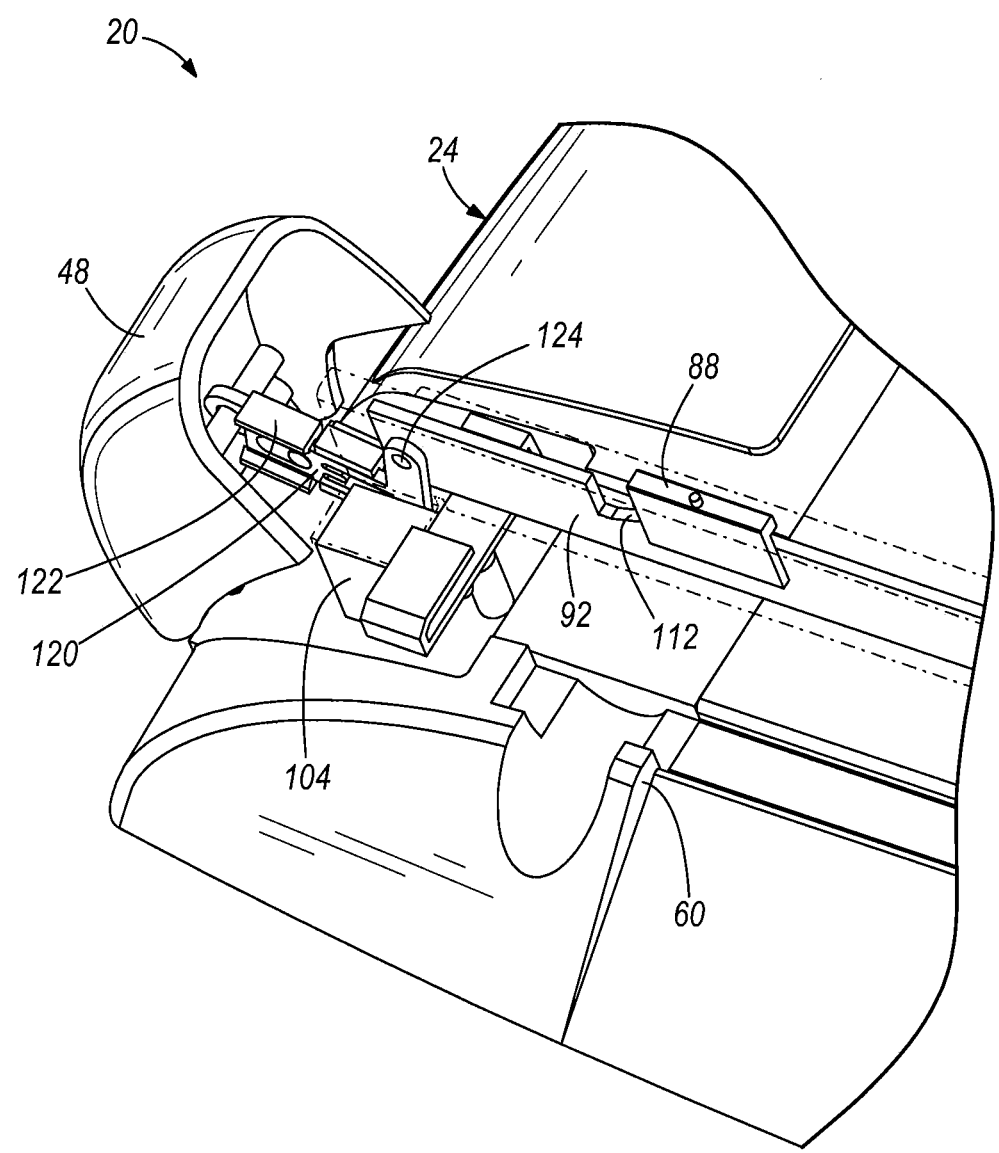
FIG. 10 is an enlarged perspective view of a portion of the rotary trimmer with the clamp assembly in the third position.

The clamp ramp plate 92 is attached to the first support 48 by an L-shaped linkage member 120, as shown in FIG. 10. In the illustrated embodiment, the linkage member 120 couples to a hole 124 in the clamp ramp plate 92 and slides within a guide link 122 coupled to the first support 48. Actuation of the first support 48 or a portion of the first support 48 (e.g., rotating a top of the first support 48 in the direction of arrow R in FIG. 7A) pulls the clamp ramp plate 92 horizontally in the direction of arrow C in FIG. 7A via movement of the linkage member 120. When the clamp ramp plate 92 translates horizontally, the notches 112 ramp against (i.e., slide along) the angled surfaces 108 of the clamp wedges 88, causing the clamp ramp plate 92 to move downwardly relative to the rail 28 from a raised position (FIGS. 8A and 8B) to a lowered position (FIGS. 8C, 8D, and 9). Moving the clamp ramp plate 92 downwardly likewise moves the clamp bar 96 and the foam strip 116 downwardly to clamp the paper. This secondary clamping capability (i.e., manual clamping mode) facilitates clamping larger stacks of paper (e.g., more than fifteen sheets).

Figure 11A:
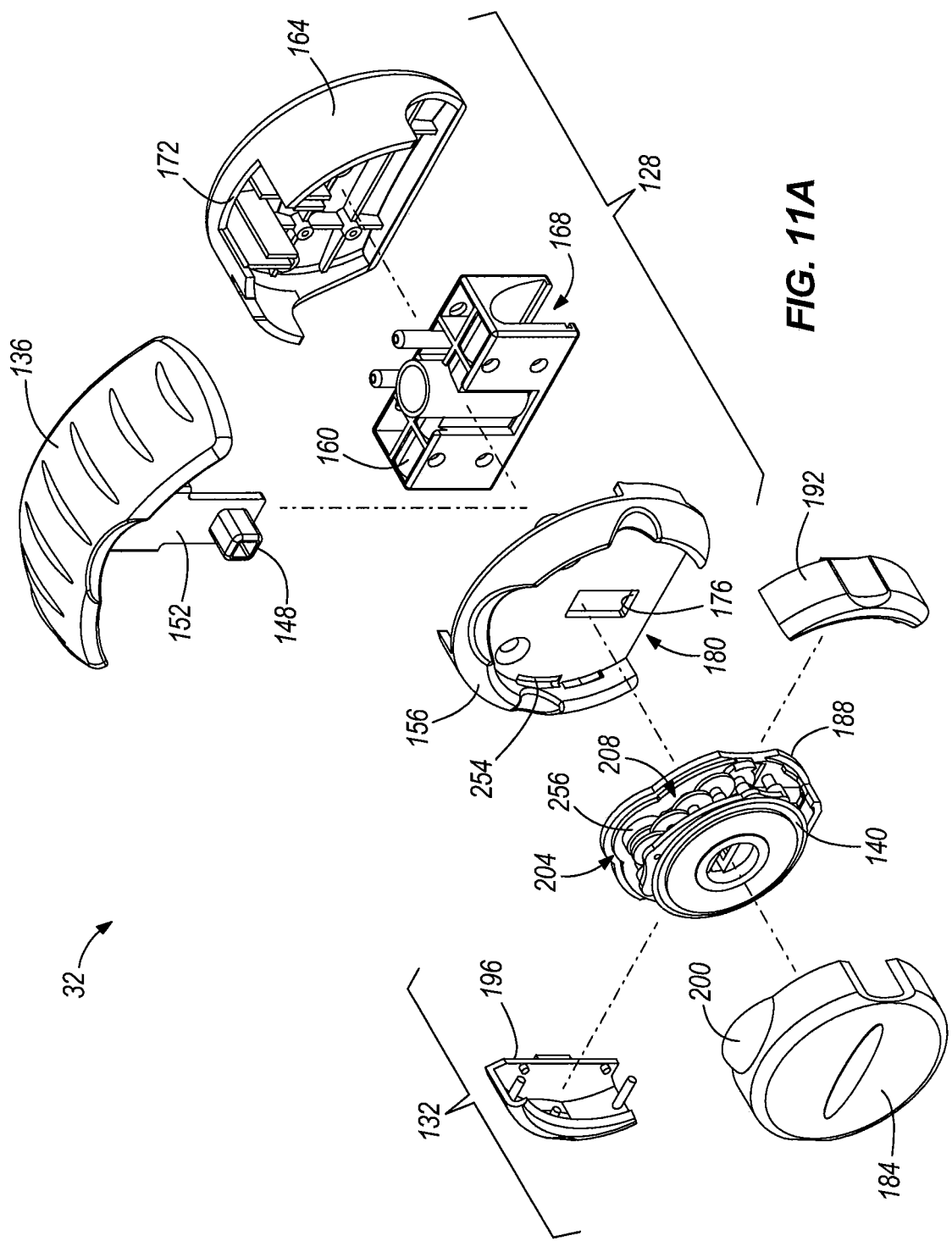
FIG. 11A is an exploded front perspective view of a cutting assembly of the rotary trimmer shown in FIG. 1.

Referring back to FIGS. 1-5, the illustrated cutting assembly 32 includes a carriage 128, a cartridge 132, and an actuator 136. The carriage 128 is coupled to the rail 28 such that the cutting assembly 32 may slide on the rail 28 between the first support 48 and the second support 52. The cartridge 132 detachably couples to the carriage 128 for movement with the carriage 128. As shown in FIG. 11A, the cutting assembly 32 also includes a blade 140 positioned entirely within the cartridge 132. Keeping the blade 140 entirely within the cartridge 132 facilitates cartridge 132 exchanging or handling by a user. Pressing the actuator 136 downwardly (i.e., towards the platform 24) extends the blade 140 from a bottom 144 (see FIG. 14) of the cartridge 132, exposing a portion of the blade 140 for cutting.

The cartridge 132 may include a single blade or multiple blades. In the illustrated embodiment, the cartridge 132 includes a single blade operable to perform a single type of cut, score, or perforation. However, the illustrated cartridge 132 may be quickly and easily interchanged with other cartridges that include different blades to perform different types of cuts, scores, or perforations. For example, one cartridge may include a blade operable to create a straight cut, while another cartridge includes a blade operable to create a curved or sinusoidal cut, another cartridge includes a blade operable to create a jagged cut, another cartridge includes a blade operable to create a series of perforations, and another cartridge includes a blade operable to score the paper for folding. As such, the term "cut" used herein may refer to any one of the operations performed by these, and other, blades. In some embodiments, a single cartridge may include a series of blades operable to perform a series of different cuts, scores, or perforations. In such embodiments, the cartridge 132 may include a lever, dial, or other mechanism (not shown) that is rotatable or actuatable by a user to alternate between the different blades.

FIGS. 11A-14 illustrate the cutting assembly 32 in more detail. In the illustrated embodiment, the actuator 136 includes a square post 148 supported on a downwardly-extending flange 152. The carriage 128 includes a front housing 156, a slider 160, and a rear housing 164. The slider 160 includes a bottom channel 168 configured to receive and engage a portion of the rail 28 such that the carriage 128 may slide along the rail 28. The rear housing 164 includes a top aperture 172 configured to receive the flange 152 of the actuator 136 such that the flange 152 is positioned between the slider 160 and the front housing 156 with the square post 148 extending outwardly through an opening 176 in the front housing 156. The front housing 156 includes a front recess 180 configured to receive the detachable cartridge 132.

The illustrated cartridge 132 includes a front housing 184, a rear housing 188, a first side housing or button 192, and a second side housing or button 196. The front housing 184 includes a window 200 so that an indicator 204 positioned adjacent the rear housing 188 is visible without having to disassemble the cartridge 132. In some embodiments, the window 200 may be an opening in the front housing 184. The indicator 204 displays the wear status or usable life status of the blade 140 and is described in greater detail below.

Figure 11B:
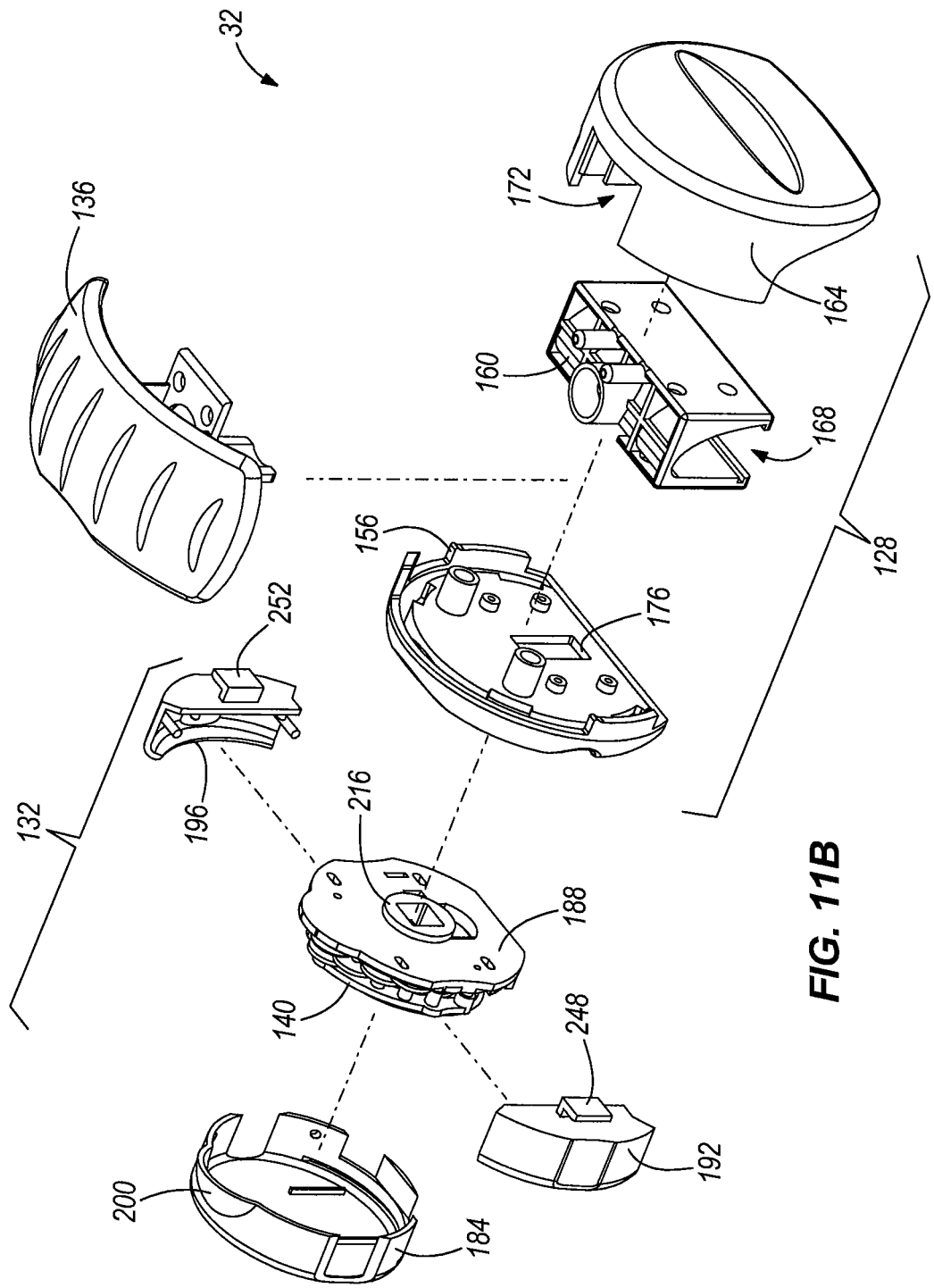
FIG. 11B is an exploded rear perspective view of the cutting assembly shown in FIG. 11A.
Figure 12:
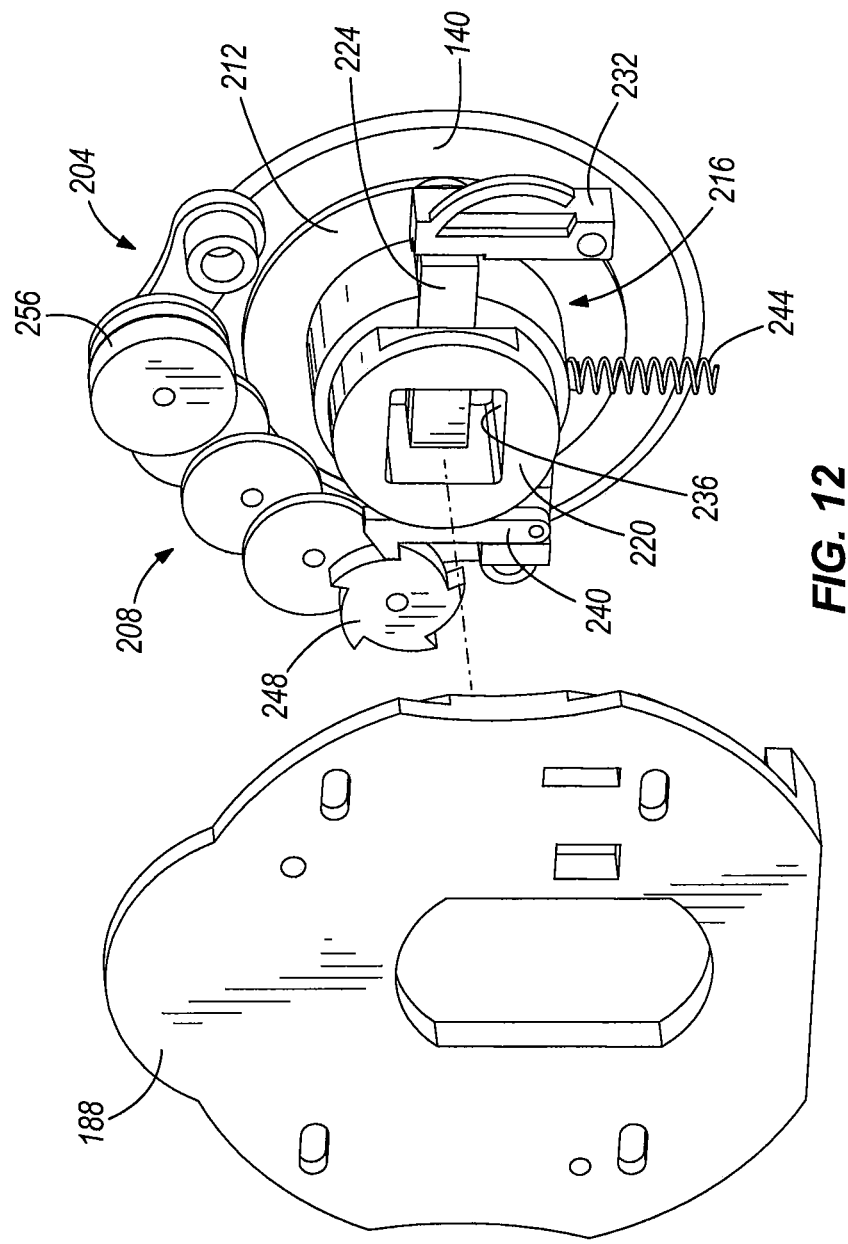
FIG. 12 is a rear perspective view of a portion of a cartridge of the rotary trimmer shown in FIGS. 11A and 11B.
Figure 13:
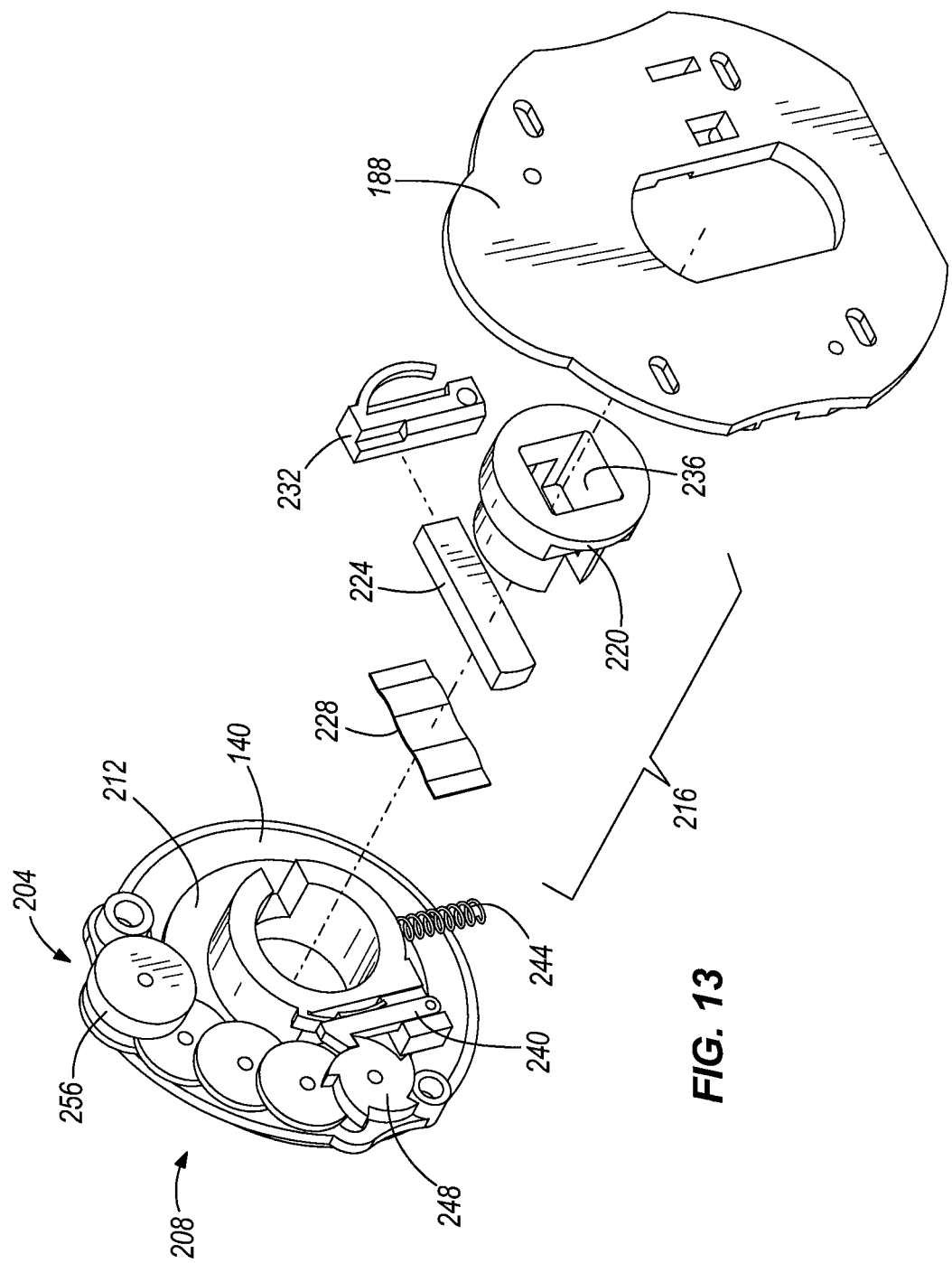
FIG. 13 is an exploded rear perspective view of the portion of the cartridge shown in FIG. 12.

Referring to FIGS. 11A-13, the illustrated cartridge 132 also includes a gear train 208 coupled between the blade 140 and the rear housing 188, a blade carrier 212 supporting the blade 140, and a blade release mechanism 216, as best shown in FIGS. 12 and 13. The blade release mechanism 216 includes a guide member 220, a bar 224, a biasing element 228, and a hooked member 232. The hooked member 232 is coupled to the blade carrier 212 and engages a projection (not shown) on the rear housing 188 to lock the blade carrier 212 and the blade 140 relative to the rear housing 188. The biasing element 228 pushes against the bar 224 to bias the hooked member 232 into this engagement. In the illustrated embodiment, the biasing element 228 is a waved sheet that biases the bar 224 towards the rear housing 188, however, other suitable biasing elements may also be employed.

The guide member 220 includes a square hole 236 configured to receive the square post 148 of the actuator 136. The square post 148 extends into the square hole 236 and engages the bar 224, pushing the bar 224 away from rear housing 188. When the bar 224 is pushed, the hooked member 232 is likewise pushed away from the rear housing 188 and no longer engages the projection (not shown) on the rear housing 188, thereby unlocking the blade carrier 212 and the blade 140 from the rear housing 188. Depressing the actuator 136 when the square post 148 is positioned within the square hole 236 thereby extends the blade 140 from the bottom 144 of the cartridge. Requiring two motions or actions to expose the blade 140 (i.e., unlocking the hooked member 232 via insertion of the square post 148 into the square hole 236, and depressing the actuator 136) reduces accidental exposure of the blade 140 during handling of the cartridge 132.

The blade carrier 212 includes a finger 240 and a spring 244. The spring 244 biases the blade carrier 212 and the blade 140 to a non-extended position. The finger 240 engages a first gear 248 of the gear train 208 such that, when the blade carrier 212 moves downwardly to extend the blade 140 from the cartridge 132, the finger 240 rotates the first gear 248. Rotation of the first gear 248 is transmitted through the gear train 208 to update or increment the blade wear or usable life status on the indicator 204, as further described below. In other embodiments, as also described below, updating the blade wear or usable life status is performed by a different mechanism on the rotary trimmer 20.

Referring back to FIGS. 11A and 11B, the first button 192 is positioned on one side of the cartridge 132 and includes a first tab 248 (see FIG. 11B). The second button 196 is positioned on another side of the cartridge 132 and includes a second tab 252. The first and second buttons 192, 196 are biased outwardly by a spring or resilient member (not shown). When the first and second buttons 192, 196 are squeezed together (e.g., pushed inwardly), the tabs 248, 252 align with slots 254 (only one of which is shown) on the front housing 156 of the carriage 128 such that the cartridge 132 may be pushed onto or pulled away from the carriage 128. When the first and second buttons 192, 196 are released, the tabs 248, 252 spread apart and, if the cartridge 132 is within the front recess 180 of the carriage 128, engage portions of the front housing 156 adjacent to the slots 254, securing the cartridge 132 to the carriage 128.

Figure 14:
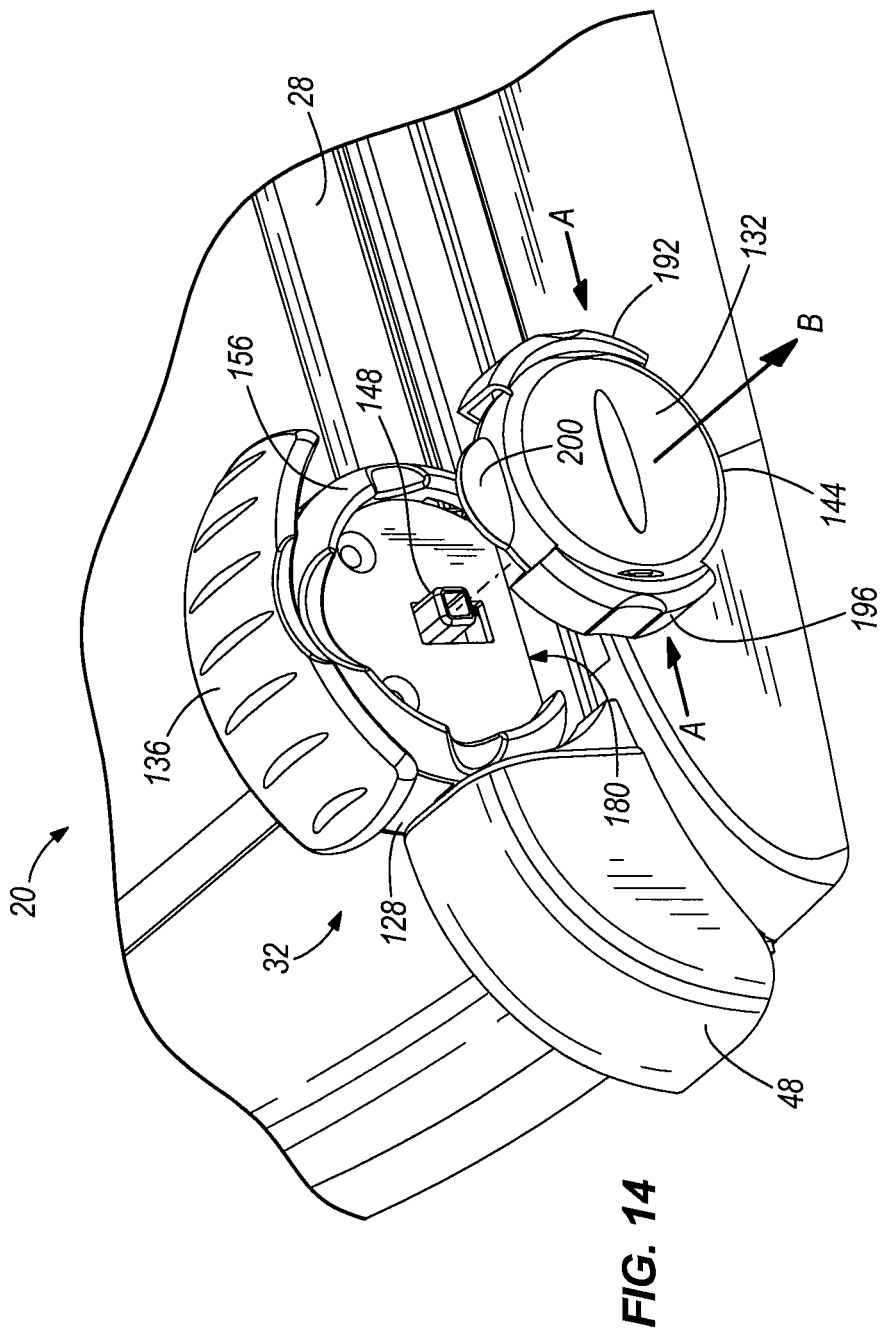
FIG. 14 is a front perspective view of the cartridge removed from the cutting assembly shown in FIG. 11A.

FIG. 14 illustrates the cartridge 132 removed from the carriage 128. The illustrated cartridge 132 is considered an easy-on/easy-off cartridge because a user is not required to rotate, fasten, or manipulate the cartridge 132 in a complex manner to detach and attach the cartridge 132 to the carriage 128. Instead, to remove the cartridge 132 from the carriage 128, the user simply presses the first, and second buttons 192, 196 inwardly (i.e., in the direction of arrows A) and pulls the cartridge 132 away from the carriage 128 (i.e., in the direction of arrow B). To reinstall the cartridge 132 or install a new cartridge, the user presses the first and second buttons 192, 196 inwardly and pushes the cartridge 132 onto the carriage 128 (i.e., in a direction substantially opposite arrow B). When the cartridge 132 is not coupled to the carriage 128, the blade release mechanism 216 is locked such that the blade 140 cannot be exposed outside the cartridge 132, allowing easier handling while replacing or exchanging the cartridge 132.

Referring to FIG. 11A and 12B, the indicator 204 displays the wear status or usable life status of the blade 140 in the cartridge 132. The wear status or usable life status of a blade can be determined in a number of ways. Wear can be directly measured or, as in the illustrated embodiments, can be determined or estimated based on usage of the cutting assembly 32. In cutting assemblies having multiple blades, multiple indicators may be positioned on the cartridge 132 to display the wear status of each blade independently. In the illustrated embodiment, the wear status or usable life status of the blade 140 is determined by the number of cutting motions performed by the blade 140 and can be counted or tracked in a number of ways. In some embodiments, such as the illustrated embodiment, a cutting motion occurs and is counted when the actuator 136 is pressed to extend the blade 140 from the cartridge 132. In other embodiments, a cutting motion occurs and is counted when the cutting assembly 32 slides along the rail 28 from one projection 48, 52 to the other projection 48, 52. In still other embodiments, a cutting motion occurs and is counted by rotations of the blade 140 and/or by the distance the cartridge 132 travels while the blade 140 is in the cutting position (e.g., extended).

In the embodiment illustrated in FIGS. 11A and 12, the indicator 204 includes the gear train 208 and a visual indication portion. The illustrated visual indication portion is a color display having an annular disc 256 that is incremented (e.g., rotates) when the actuator 136 is pressed. In such an embodiment, the indicator 204 stays with the cartridge 132 when the cartridge 132 is removed from the carriage 128 so the wear status or usable life status remains with the corresponding blade 140 even when multiple cartridges are interchanged or switched. The annular disc 256 rotates slightly each time the actuator 136 is pressed or after the actuator 136 is pressed a certain number of times, based on the gearing of the gear train 208, to display a color indicating when the blade is becoming or risks being dull or worn. For example, the annular disc 256 may include a green portion and a red portion. Initially, the green portion of the annular disc 256 may be visible through the window 200. As the annular disc 256 is rotated due to the cutting motions, the red portion of the annular disc 256 slowly becomes visible. The gear train 208 can be designed as a reducing gear train that counts the relatively large number of actuator actuations and steps down that input to the desired output rotation of the annular disc 256.

Once a substantial amount of the red portion of the annular disc 256 is visible through the window 200, a user knows the blade 140 has become or risks becoming worn and replaces the cartridge 132 and worn blade 140 with a new cartridge and blade. Additionally or alternatively, the indicator 204 may include a word (e.g., WORN, REPLACE, etc.) that slowly becomes visible through the window 200 as the annular disc 256 rotates due to the cutting motions. The indicator 204 can be set or configured to indicate wear status or usable life of the blade 140 based on an expected usable life determined by the manufacturer.

In some embodiments, the indicator 204 may include other types of visual indication portions, such as a numeric counter that is incremented to display the number of cutting motions performed by the blade 140. When the counter reaches a predetermined number, the user knows the blade 140 has become or risks becoming worn. In other embodiments, the indicator 204 may be a numeric counter that counts down from the predetermined number. In such embodiments, when the counter reaches zero, the user knows the blade 140 has become or risks becoming worn. In still other embodiments, the counter may not be visible to the user. Instead, when the counter reaches the predetermined number or reaches zero, the counter may trigger a second indicator such as, for example, an LED or other light to indicate that the blade 140 has become or risks becoming worn. The second indicator may be positioned such that it is visible through the window 200, or the second indicator may be positioned on the platform 24.

Figure 15:
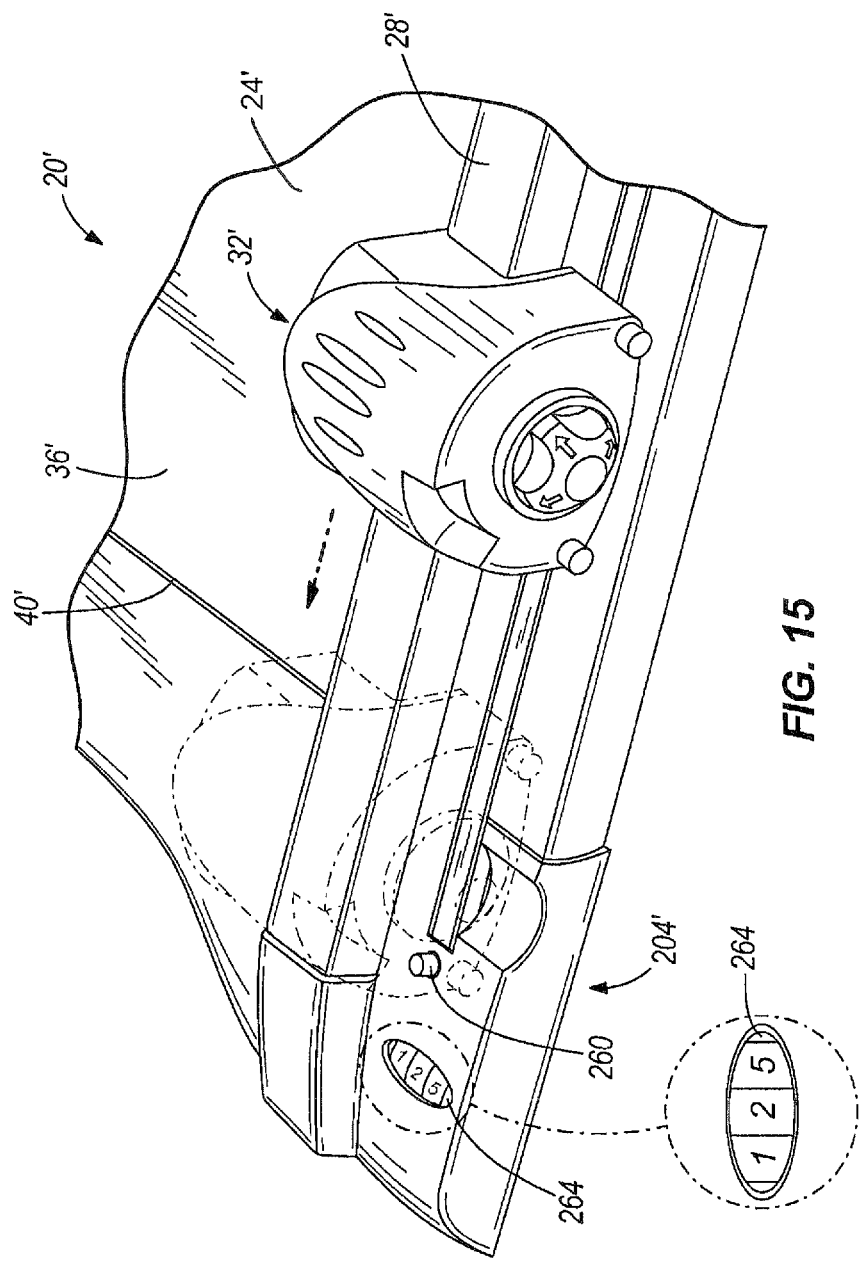
FIG. 15 is a perspective view of a portion of another embodiment of a rotary trimmer.

FIG. 15 illustrates a rotary trimmer 20' according to another embodiment of the present invention. The rotary trimmer 20' is similar to the rotary trimmer 20 illustrated in FIGS. 1-5, and corresponding parts have been given similar reference numerals with the addition of a prime symbol.

In the embodiment illustrated in FIG. 15, a cutting motion is counted when the cutting assembly 32' slides along the rail 28'. The indicator 204' is actuated (e.g., rotated, increased/decreased in number, etc.) by a switch 260 positioned on the platform 24'. The switch 260 may be, for example, a limit switch, a touch sensor, a pressure sensor, an optical sensor, a magnet, a mechanical pin, or the like. As the cutting assembly 32' passes over the switch 260, the switch 260 senses the cutting motion and actuates the indicator 204'. In the embodiment illustrated, a counter 264 is positioned on the platform 24' and directly connected to the switch 260 to display the number of cutting motions performed by the cutting assembly 32'.

Figure 16:
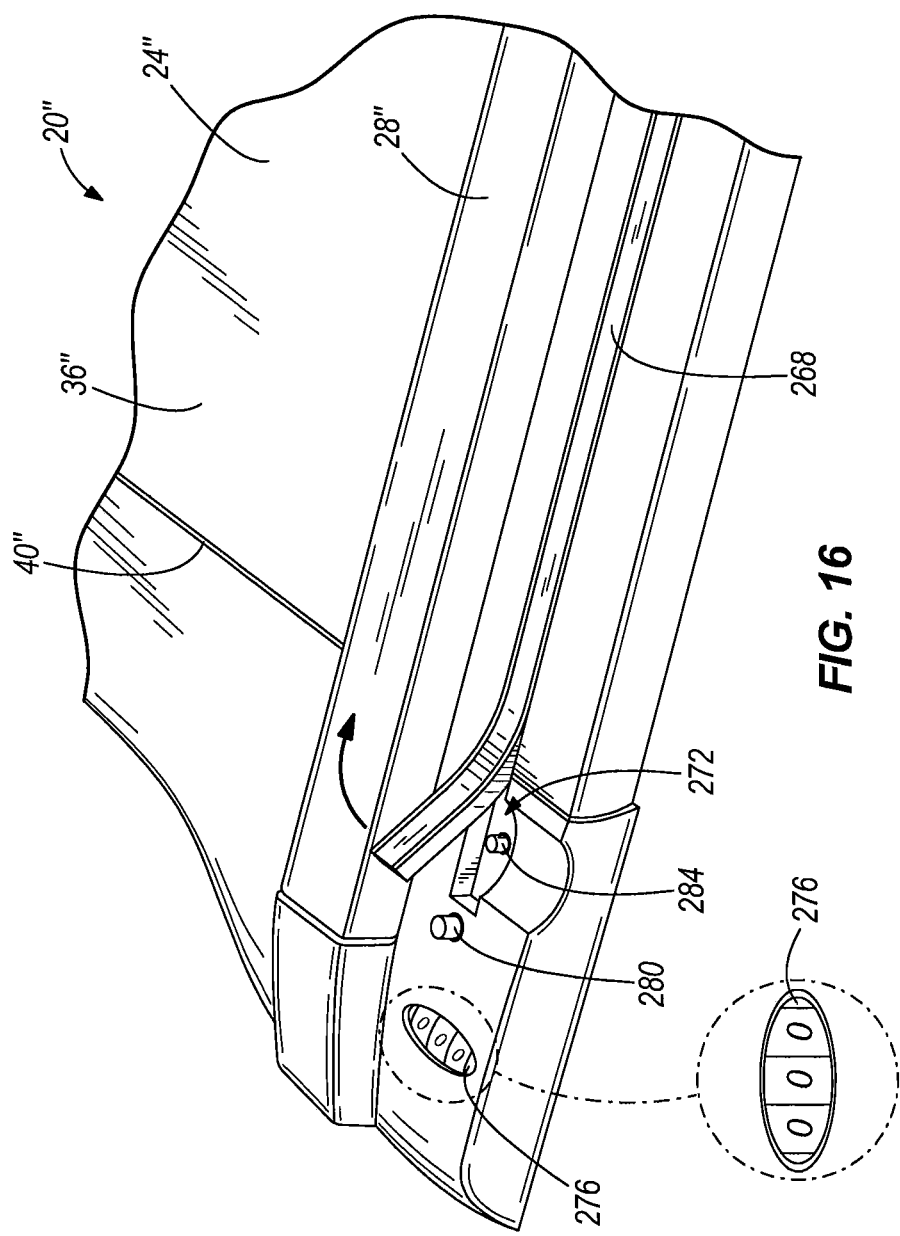
FIG. 16 is a perspective view of a portion of yet another embodiment of a rotary trimmer.

FIG. 16 illustrates a blade opposing member in the form of a cutting mat 268 that is usable with a rotary trimmer 20" having a cutting mat usable life or wear indicator. In other embodiments, the wear indicator may be used to monitor the wear status of other types of blade opposing members, such as, for example, a member or surface fixed to the platform 24 against which a blade cuts or shears the paper. The cutting mat 268 is composed of a self-healing resilient material and is positioned within a recess 272 on the platform 24" adjacent to the rail 28". When the blade cuts the paper, a portion of the blade extends into the cutting mat 268, also cutting the cutting mat 268. After a certain number of cuts, the cutting mat 268 becomes worn and should be replaced. In some embodiments, the cutting mat 268 is reversible such that each side of the cutting mat 268 may be cut into before the cutting mat 268 is replaced. Additionally or alternatively, the cutting mat 268 may be rotated 180 degrees such that a different portion of the cutting mat 268 may be cut into before replacement is necessary.

In the illustrated embodiment, the platform 24" includes a counter 276, a count button 280, and a reset button 284. The counter 276 increments (e.g., increases) each time the blade cuts into the cutting mat 268 and indicates to a user when the cutting mat 268 is worn and should be replaced. For example, in one embodiment, the counter 276 increases each time the cutting assembly (not shown in FIG. 16) slides along the rail 28" and contacts the count button 280. Alternatively, the counter 276 may begin at a predetermined number and count down to zero to indicate when the cutting mat 268 is worn. Although the counter 276 shown is a numeric counter, the counter 276 may alternatively be a color or word display such that a different color or word becomes visible when the cutting mat 268 is worn. The illustrated reset button 284 is positioned in the recess 272 beneath the cutting mat 268 such that, when a user lifts the cutting mat 268 to replace or rotate the cutting mat 268, the counter 276 is returned to its initial non-worn setting (e.g., zero). Alternatively, the reset button 284 can be positioned elsewhere on the trimmer 20" and actuated manually.

In some embodiments, the switch 260 of FIG. 15 and the count button 280 of FIG. 16 may be integrated into a single button that actuates both counters 264, 276. In such embodiments, actuation of the single button would cause an increase in the counters 264, 276 to indicate to a user when a blade opposing member (e.g., a cutting mat) and/or when a blade is becoming or risks being worn.

Figure 17:
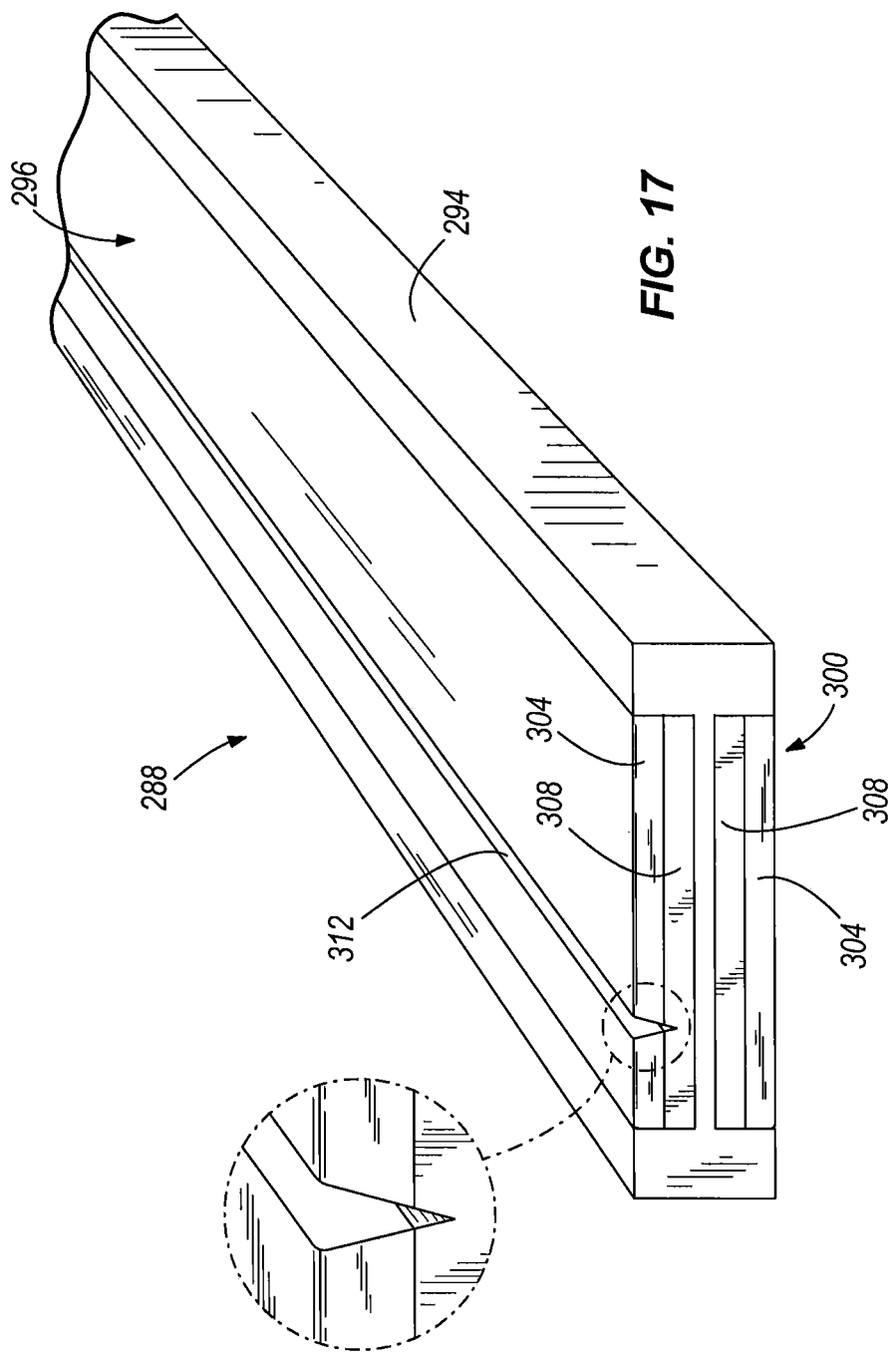
FIG. 17 is a perspective view of a cutting mat assembly for the rotary trimmer shown in FIGS. 1, 15, or 16.

FIG. 17 illustrates another embodiment of a cutting mat assembly 288. The cutting mat assembly 288 includes a generally I-shaped substrate 294, a first cutting mat portion 296, and a second cutting mat portion 300. The cutting mat portions 296, 300 are positioned on opposite sides of the substrate 294 such that the cutting mat assembly 288 is reversible and rotatable. As such, the cutting mat assembly 288 may be flipped such that a user may cut into either one of the first or second cutting mat portions 296, 300 without affecting the other cutting mat portion 296, 300. In addition, the cutting mat assembly 288 may be rotated 180 degrees such that a different portion of each cutting mat portion 296, 300 are cut by the blade. In other embodiments, the cutting mat assembly may include a U-shaped substrate and only one cutting mat such that the cutting mat assembly is not reversible.

Each cutting mat portion 296, 300 includes a top layer 304 and a bottom layer 308. The top layer 304 and the bottom layer 308 may be two discrete layers or may be molded together into a single piece. The layers 304, 308 are colored such that the bottom layer 308 is a distinct color relative to the top layer 304. For example, the top layer 304 may be a light, dull color (e.g., white) while the bottom layer 308 may be a darker, brighter color (e.g., red). When the blade 140 cuts into the first or second cutting mat portion 296, 300, a slit 312 is formed in the corresponding cutting mat portions 296, 300. As more slits 312 are formed in the cutting mat portion 296, 300 or the slit 312 fails to self-heal (i.e., fails to return to close to the original pre-cut state), the bottom layer 308 becomes visible, indicating to a user to reverse, rotate, or replace the cutting mat assembly 288.

Figure 18A:
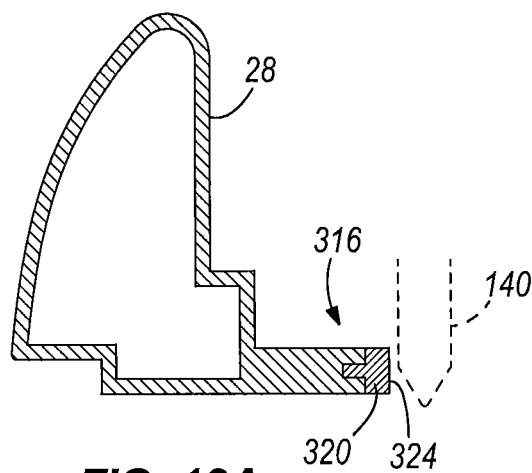
FIG. 18A is a cross-sectional view of a cutting line indicator coupled with a rail of the rotary trimmer of FIG. 1.
Figure 18B:
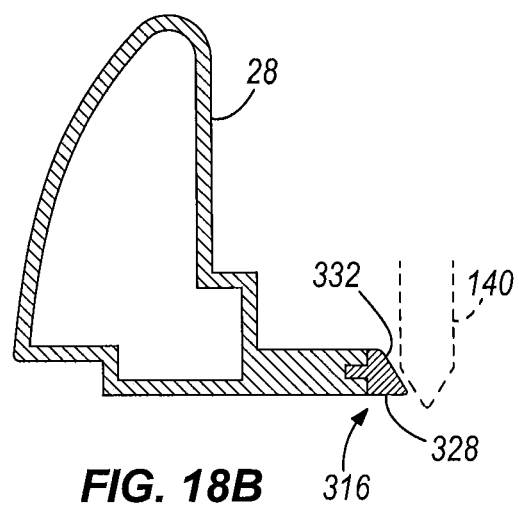
FIGS. 18B-18L are cross-sectional views of other embodiments of cutting line indicators.
Figure 18C:
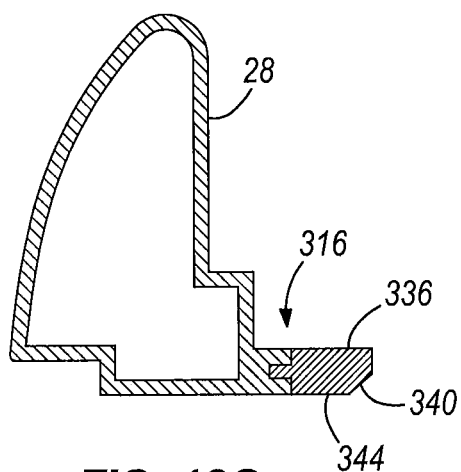
Figure 18D:
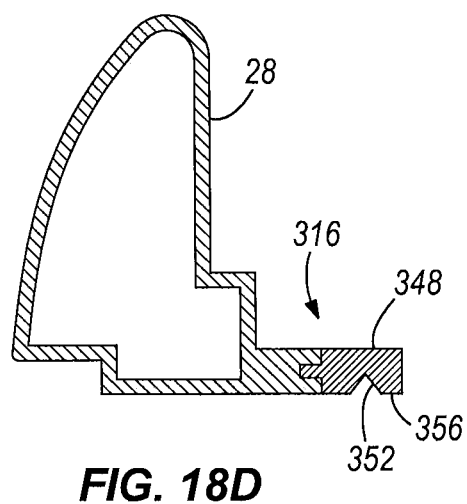
Figure 18E:
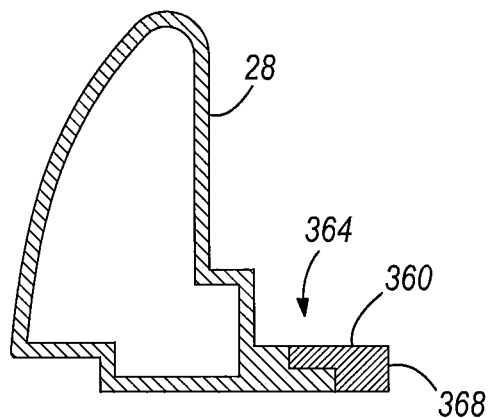
Figure 18F:
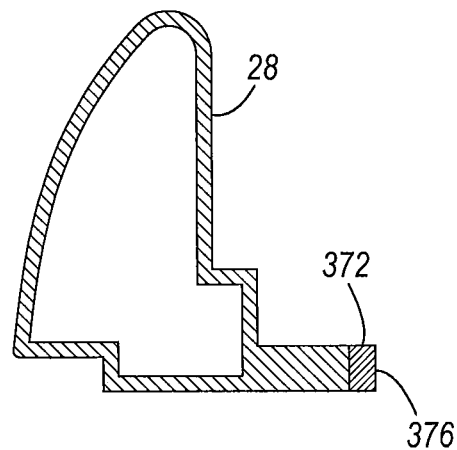
Figure 18G:
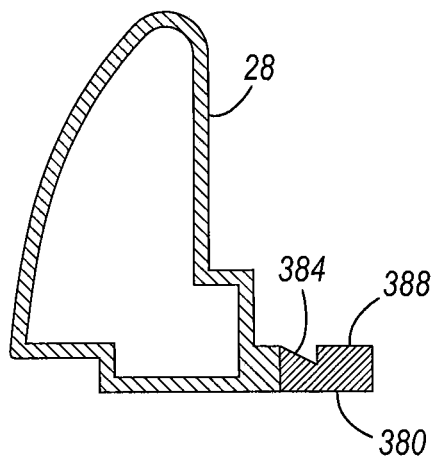
Figure 18H:
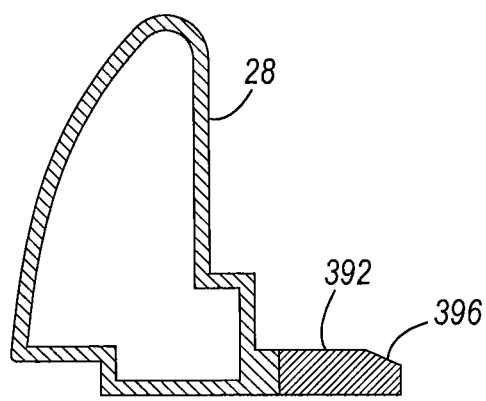
Figure 18I:
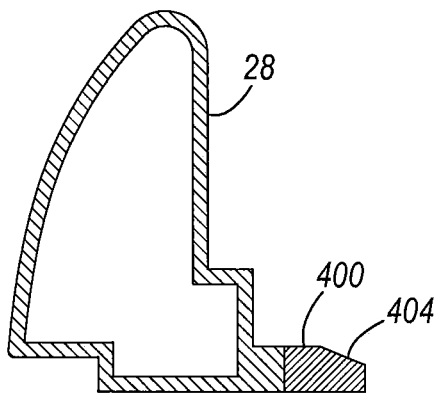
Figure 18J:
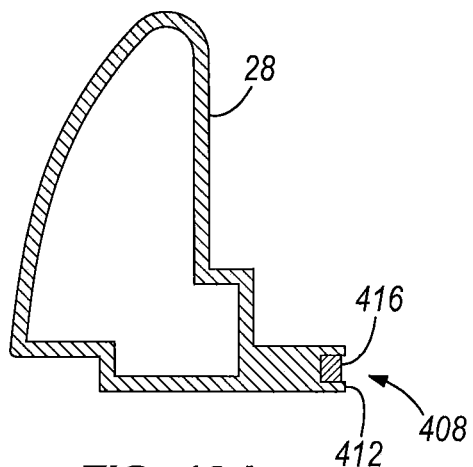
Figure 18K:
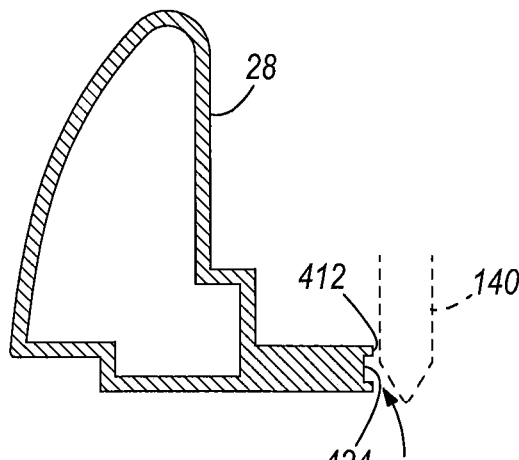
Figure 18L:
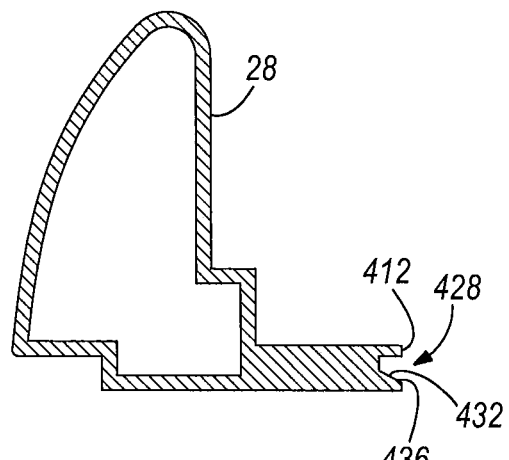
Figure 19:
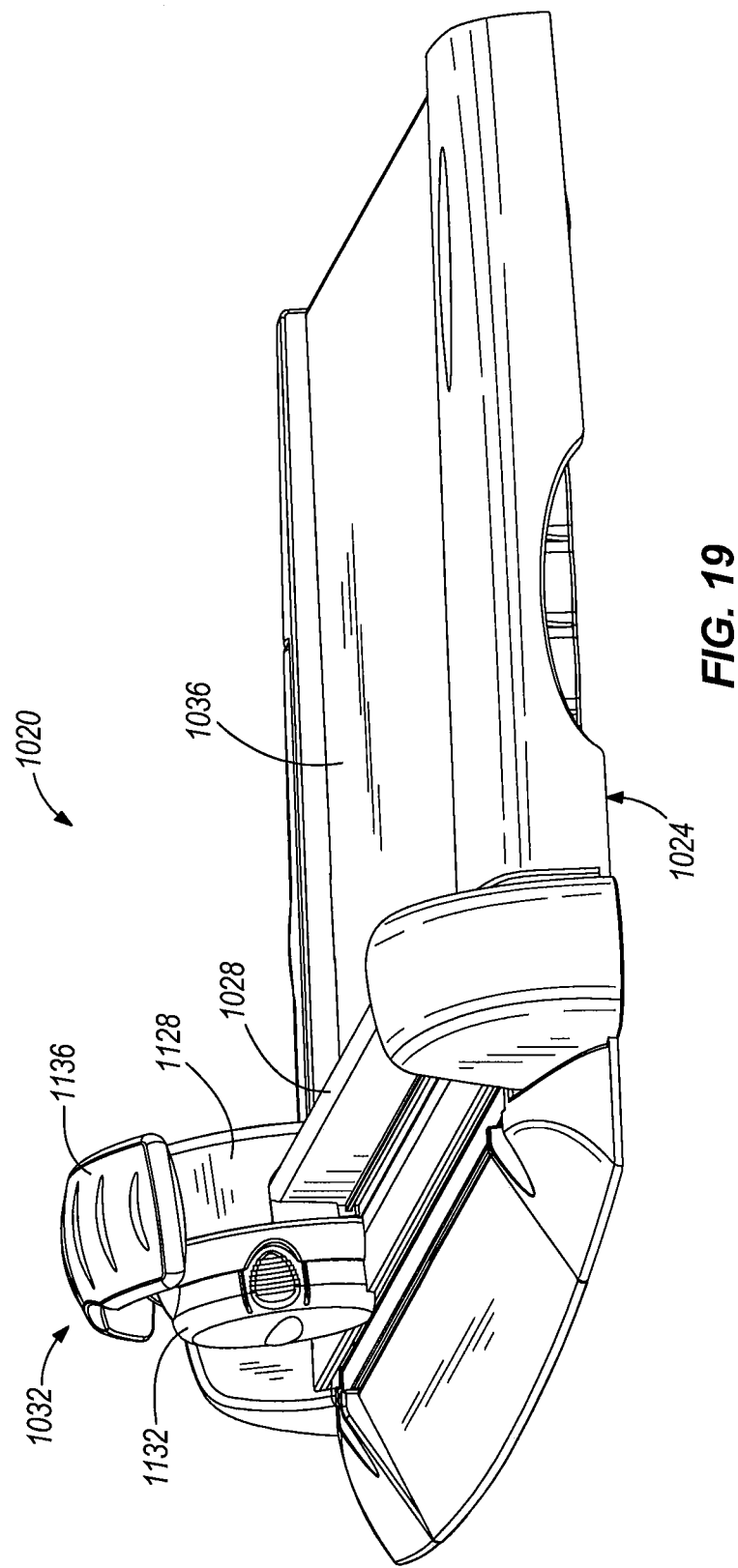
FIG. 19 is a perspective view of another embodiment of a rotary trimmer.

FIGS. 18A-18L illustrate a variety of cutting line indicators 320, 328, 336, 348, 360, 372, 380, 392, 400, 416, 424, 432 for use with any of the rotary trimmers 20, 20', or 20". The illustrated cutting line indicators are positioned on or adjacent the platform 24 and/or the rail 28 to specify and help call to the user's attention the location of a cutting line of the trimmer 20 (i.e., where the blade 140 will cut the paper). The illustrated cutting line indicators provide a sharp contrast in color from the adjacent portions of the rail 28 and/or platform 24 to clearly highlight the cutting edge for the user. In FIGS. 18A-18J, the cutting line indicators 320, 328, 336, 348, 360, 372, 380, 392, 400, 416 are pieces of brightly colored plastic or edge glow material capable of luminescing or illuminating when exposed to light. In some embodiments, the ambient light causes the cutting line indicators to luminesce, while in other embodiments, the rotary trimmer 20 may include LED's or light bulbs to facilitate proper illumination of the cutting line indicators. In the illustrated embodiments, the cutting line indicators 320, 328, 336, 348, 360, 372, 380, 392, 400, 416 may be press-fit onto the rail 28, secured to the rail 28 by an adhesive, and/or secured to the rail 28 by another fastener (e.g., nail, pin, screw, etc.). In FIGS. 18K-18L, the cutting line indicators 424, 432 are painted, printed, or otherwise applied onto the rail 28 with a contrasting color paint, ink, or other coating.

As shown in FIGS. 18A-18D, the cutting line indicators 320, 328, 336, 348 are connected to the rail 28 by a tongue and groove arrangement 316. The cutting line indicator 320 illustrated in FIG. 18A includes a flat surface 324 to identify, or designate, the cutting line. The cutting line indicator 328 illustrated in FIG. 18B includes an angled surface 332 to identify the cutting line. The angled surface 332 identifies the cutting line closer to the true cutting line of the blade 140 by accounting for the bevel of the blade 140. The cutting line indicator 336 illustrated in FIG. 18C includes an angled surface 340 on a bottom 344 of the indicator 336. The cutting line indicator 348 illustrated in FIG. 18D includes a groove 352 on a bottom 356 of the indicator 348. The angled surface 340 and the groove 352 facilitate illumination by changing the angle at which light enters and/or refracts within the cutting line indicators 336, 348.

As shown in FIG. 18E, the cutting line indicator 360 is connected to the rail 28 by a lap joint 364. The cutting line indicator 360 includes a flat surface 368 to identify the cutting line.

As shown in FIGS. 18F-18I, the cutting line indicators 372, 380, 392, 400 squarely abut the rail 28. The cutting line indicator 372 illustrated in FIG. 18F includes a flat surface 376 to identify the cutting line. The cutting line indicator 380 illustrated in FIG. 18G includes a groove 384 on a top surface 388 of the indicator 380. The groove 384 facilitates illumination by increasing the surface area and by changing the angle at which light enters and/or refracts within the cutting line indicator 380. The cutting line indicator 392 illustrated in FIG. 18H is a relatively wider cutting line indicator with increased surface area to facilitate illumination when exposed to light. The cutting line indicator 392 includes an angled surface 396 to identify the cutting line. The cutting line indicator 400 illustrated in FIG. 18I includes an angled surface 404 to identify the cutting line. The angled surfaces 396, 404 can identify the cutting line closer to the true cutting line of the blade 140 by accounting for the bevel of the blade 140.

As shown in FIG. 18J, the rail 28 includes a recess 408 positioned on an outwardly facing surface 412. In the illustrated embodiment, the cutting line indicator 416 is positioned at least partially within the recess 408 to identify the cutting line.

As shown in FIGS. 18K-18L, the cutting line indicators 424, 432 are painted, printed, or otherwise applied onto a surface of the rail 28. In the embodiment illustrated in FIG. 18K, the rail 28 includes a recess 420 on the outwardly facing surface 412, and the cutting line indicator 424 is applied on an inner surface of the recess 420. Applying the cutting line indicator 424 within the recess 420 helps prevent the applied coating from wearing off due to contact with the cutting blade 140. In the embodiment illustrated in FIG. 18L, the rail 28 includes a groove 428 on the outwardly facing surface 412, and the cutting line indicator 432 is applied on a sloped surface 436 of the groove 428. The sloped surface 436 can identify the cutting line closer to the true cutting line of the blade 140 by accounting for the bevel of the blade 140.

In operation, a user places a sheet or a stack of sheets of paper on the flat portion 36 of the platform 24 and slides a portion of the paper under the rail 28. The user aligns the paper with a cutting line indicator such that a cut is formed at the desired location of the paper. The user then presses downwardly (i.e., towards the platform 24) on the actuator 136 to extend the blade 140 from the bottom 144 of the cartridge 132. When the user presses the actuator 136, the indicator 204 actuates (e.g., rotates, increases/decreases in number, etc.) to update the wear status of the blade 140. Then, the user slides the cutting assembly 32 along the rail 28 between the first support 48 and the second support 52, or vice versa. As the cutting assembly 32 slides along the rail 28, the blade 140 rotates within the cartridge 80 and cuts the paper. In embodiments where the blade 140 is a fixed blade, the blade 140 remains stationary relative to the cartridge 132 during cutting. Once the cut is completed, the user releases the downward pressure from the actuator 136, retracting the blade 140 and allowing the user to remove the paper from the platform 24 without risk of contacting the blade 140. The user may then position and align a new sheet or stack of sheets of paper to be cut on the platform 24, or realign the current paper to create additional cuts.

FIGS. 19-27B illustrate another embodiment of a rotary trimmer 1020. The rotary trimmer 1020 is similar to the rotary trimmer 20 discussed above with reference to FIGS. 1-14 and like parts have been given the same reference number plus 1000.

Figure 20:
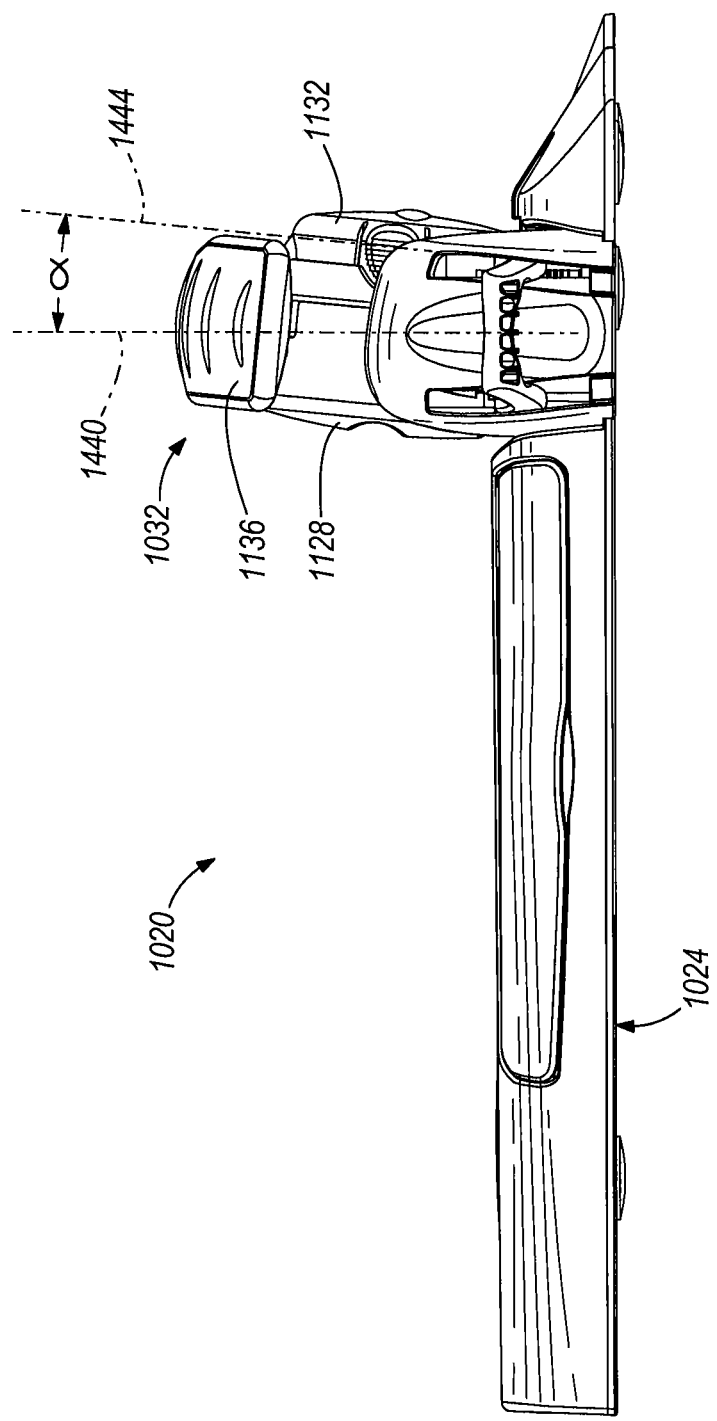
FIG. 20 is a side view of the rotary trimmer shown in FIG. 19.

Similar to the rotary trimmer 20, the illustrated rotary trimmer 1020 includes a platform or base 1024, a rail 1028, and a cutting assembly 1032. In the illustrated embodiment, the platform 1024 includes a flat portion 1036, or support portion, to support a sheet or stack of sheets of paper. As shown in FIG. 20, a plane 1440 extends substantially perpendicularly from the flat portion 1036 of the platform 1024 and through the rail 1028.

Figure 21:
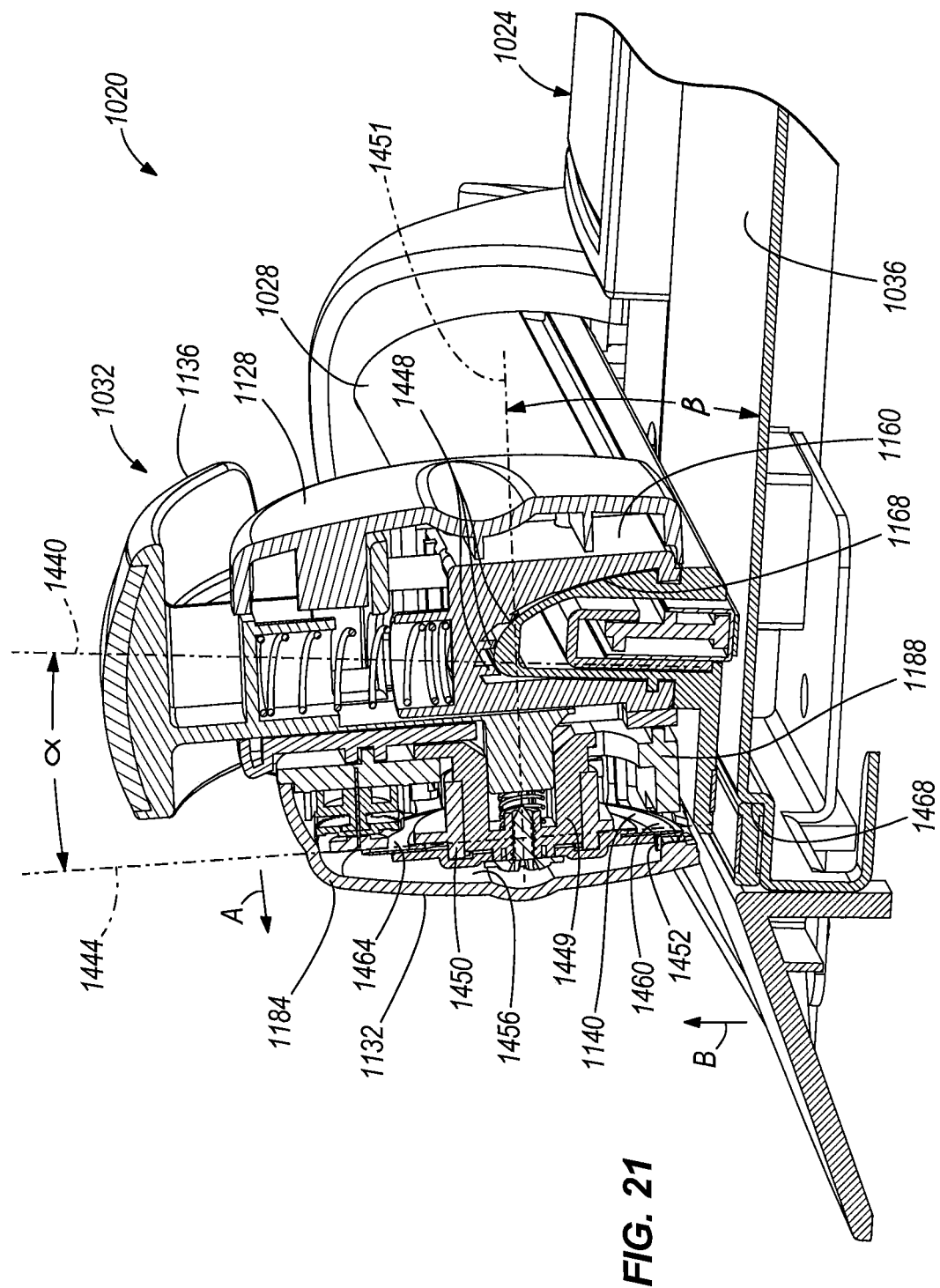
FIG. 21 is a cross-sectional view of the rotary trimmer shown in FIG. 19.

The illustrated cutting assembly 1032 includes a carriage 1128, a cartridge 1132, and an actuator 1136. The cartridge 1132 is removably coupled to the carriage 1128 and encloses a blade 1140. As shown in FIGS. 20 and 21, the blade 1140 is rotatably mounted within the cartridge 1132 and defines a plane 1444. In the illustrated embodiment, the blade 1140 is tilted or inclined relative to the rail 1028 such that the plane 1444 defined by the blade 1140 is tilted at an angle α relative to the plane 1440 extending perpendicularly from the flat portion 1036 of the platform 1024. That is, a bottom portion 1460 of the blade 1140 is generally angled toward the rail 1028 to facilitate cutting close to a cutting line (e.g., designated by one of the cutting line indicators of FIGS. 18A-18L discussed above). In some embodiments, the angle α may be between about 3° and about 15°. In the illustrated embodiment, the angle a is about 5.5°.

As shown in FIG. 21, the carriage 1128 includes projections 1448 formed in a bottom channel 1168 of a slider 1160 that engage the rail 1028 to help maintain the angle α between the planes 1440, 1444. The projections 1448 also help the carriage 1128 slide along the rail 1028 by reducing the contact area between the slider 1160 and the rail 1028. In other embodiments, the rail 1028 may be tilted relative to the platform 1024 to help maintain the angle α.

Figure 22:
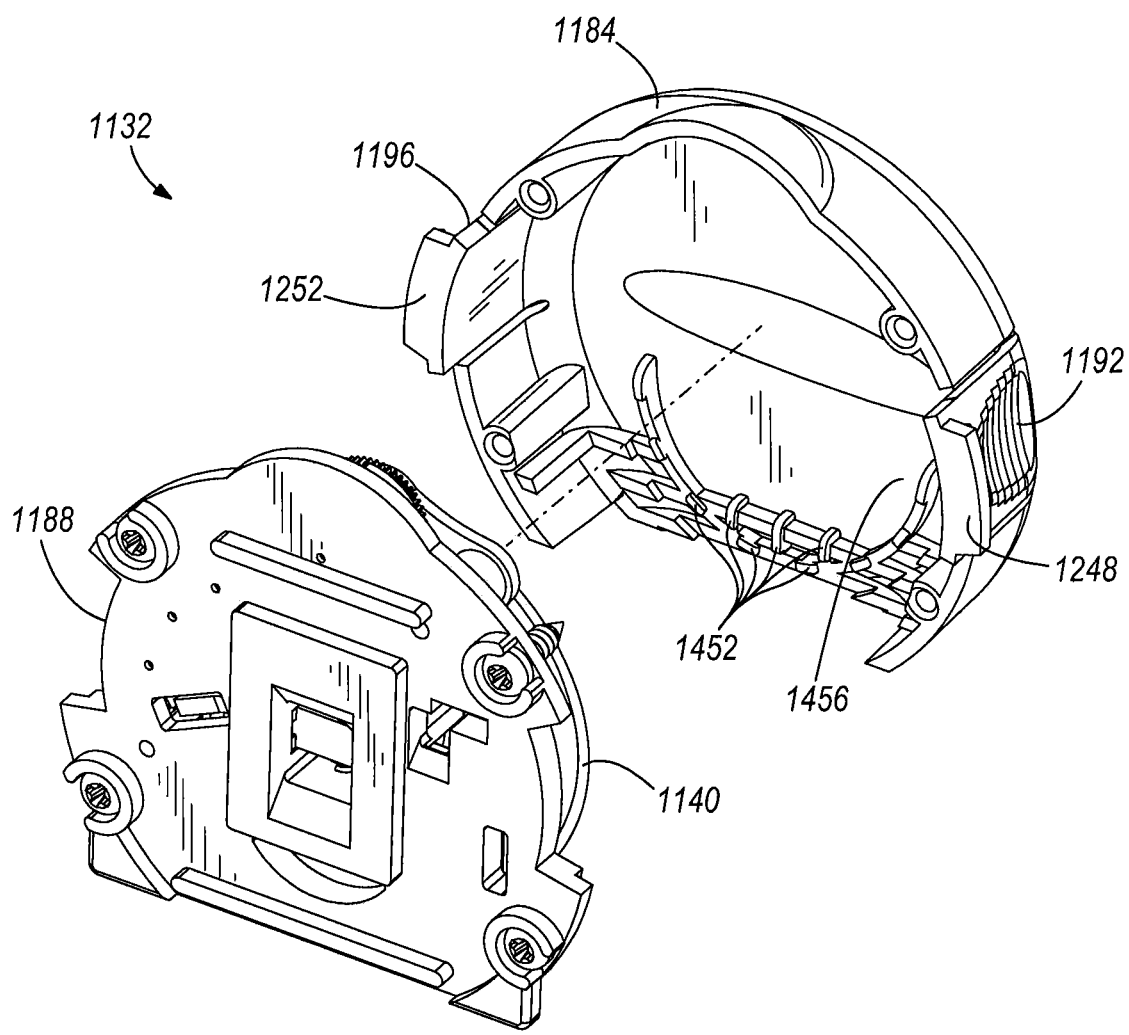
FIG. 22 is an exploded view of a cartridge for use with the rotary trimmer shown in FIG. 19.

Referring to FIGS. 21 and 22, the cartridge 1132 includes a front housing 1184 and a rear housing 1188. In the illustrated embodiment, first and second buttons 1192, 1196 are integrally formed as a single piece with the front housing 1184 to help uncouple or release the cartridge 1132 from the carriage 1128. Similar to the buttons 192, 196 discussed above, the buttons 1192, 1196 include tabs 1248, 1252 that engage the carriage 1128 to couple the cartridge 1132 to the carriage 1128.

The illustrated blade 1140 is supported for rotation relative to the cutting assembly 1032 by a blade bearing assembly. In the illustrated embodiment, the blade bearing assembly includes a boss 1449 extending from the rear housing 1188 and a bearing 1450 surrounding the boss 1449 and coupled to the blade 1140. As shown in FIG. 21, the blade bearing assembly defines an axis 1451 about which the blade 1140 rotates. The illustrated axis 1451 is angled relative to the support surface 1036 of the platform 1024 by an angle β. In some embodiments, the angle β is between about 3° and about 15°. In the illustrated embodiment, the angle β is about 5.5°. Although the cutting assembly 1032 is described above with reference to a rotary trimmer, it should be readily apparent to one skilled in the art that, in other embodiments, the cutting assembly 1032 may be used with a fixed blade trimmer such that the blade 1140 does not rotate.

The illustrated cartridge 1132 also includes a plurality of ribs 1452 coupled to an inner surface 1456 of the front housing 1184. The ribs 1452, or blade guide means, engage the bottom portion 1460 of the blade 1140 to bias the bottom portion 1460 toward the cutting line. In addition, the ribs 1452 help stabilize the blade 1140 by inhibiting wobbling or teetering of the blade 1140 as the cutting assembly 1032 slides along the rail 1028, rotating the blade 1140. In the illustrated embodiment, the ribs 1452 are integrally formed as a single piece with the front housing 1184. In other embodiments, the ribs 1452 may be a separate component coupled to the front housing 1184. Additionally or alternatively, ribs 1452 may be formed on or coupled to the rear housing 1188 to bias a top portion 1464 of the blade 1140 away from (and, thereby, the bottom portion 1460 toward) the rail 1028. In the illustrated embodiment, the top portion 1464 is spaced from a vertical surface 1468 of a cutting mat groove formed in the platform 1024 in a first (e.g., horizontal) direction A. In addition, the top portion 1464 is spaced from the flat surface 1036 of the platform in a second (e.g., vertical) direction B. In the illustrated embodiment, the top portion 1464 of the blade 1140 is spaced further from the platform 1024 than the bottom portion 1464 in both the first and second directions A, B.

Tilting the blade 1140 relative to the rail 1028 helps position the bottom portion 1460 of the blade 1140 closer to a cutting line designated by a cutting line indicator than if the blade 1140 was parallel to the plane 1440 extending substantially perpendicularly from the flat portion 1036 of the base 1024. In addition, providing blade guide means (e.g., ribs 1452) helps reduce the chance of wavy or uneven cuts due to the blade 1140 wobbling as the cutting assembly 1032 slides along the rail 1028.

Figure 23:
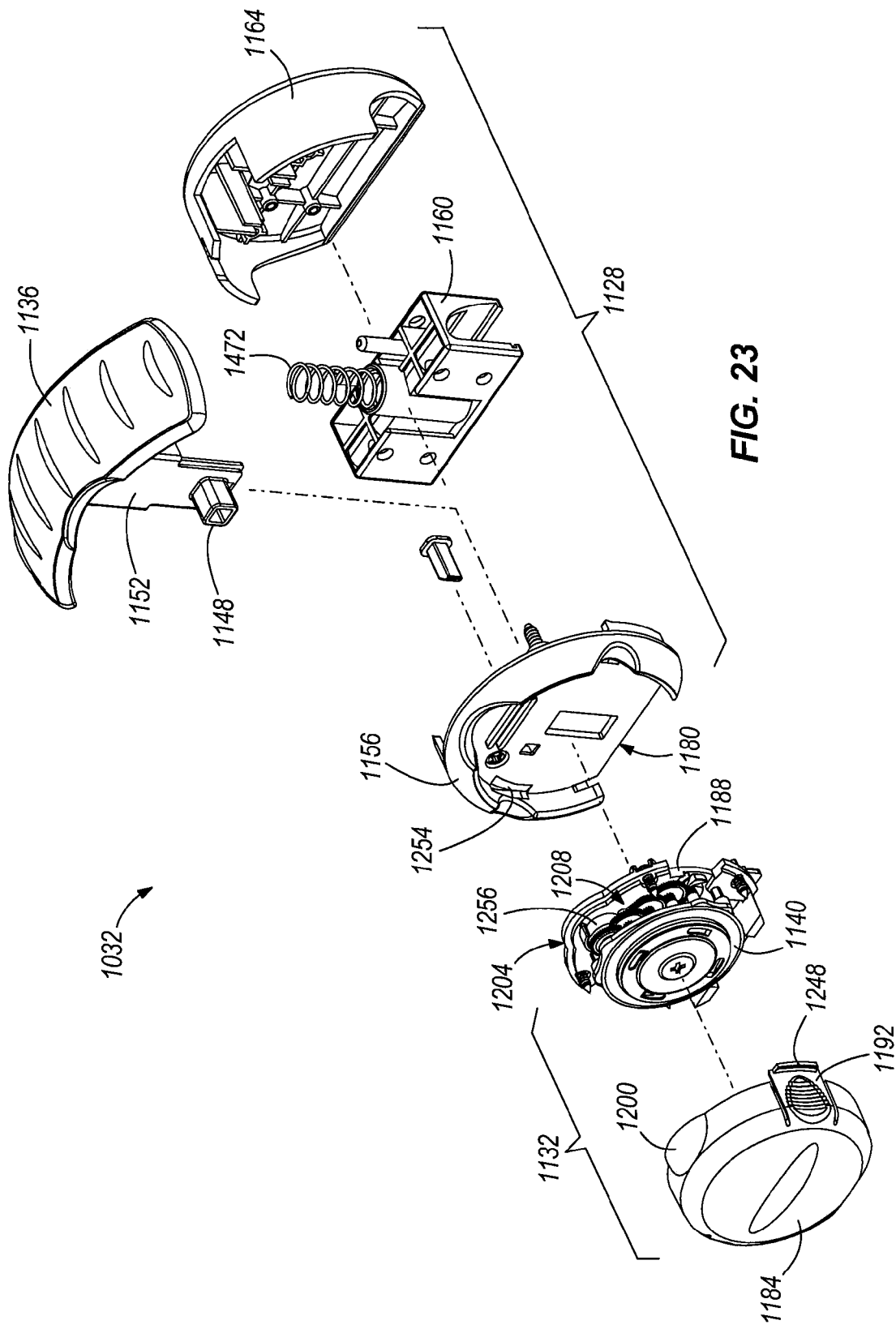
FIG. 23 is an exploded view of a cutting assembly for use with the rotary trimmer shown in FIG. 19, the cutting assembly including the cartridge.

As shown in FIG. 23, the cutting assembly 1032 is illustrated in more detail. The actuator 1136 of the cutting assembly 1032 includes a square post 1148 supported on a downwardly-extending flange 1152. The carriage 1128 includes a front housing 1156, a slider 1160, and a rear housing 1164. The front housing 1156 includes a front recess 1180 configured to receive the detachable cartridge 1132. The slider 1160 receives and engages a portion of the rail 1028 such that the carriage 1128 may slide along the rail 1028. A biasing member 1472 (e.g., a coil spring) is positioned between the slider 1160 and the actuator 1136 to bias the actuator 1136 away from the slider 1160.

Similar to the embodiment of FIGS. 11A and 11B, the cartridge 1132 includes the first button 1192, the second button 1196, and a window 1200 to view an annular disc 1256 of a blade wear indicator 1204. The first button 1192 is positioned on one side of the cartridge 1132 and includes the first tab 1248, and the second button 1196 (FIG. 22) is positioned on another side of the cartridge 1132 and includes the second tab 1252. In the illustrated embodiment, the first and second buttons 1192, 1196 are integrally formed as single piece with the front housing 1184 of the cartridge 1132 such that the resiliency of the housing material (e.g., plastic) biases the buttons 1192, 1196 outwardly. In some embodiments, a biasing member may also be positioned within the cartridge to bias the buttons 1192, 1196 outwardly. When the first and second buttons 1192, 1196 are squeezed together, the tabs 1248, 1252 align with slots 1254, or openings, (only one of which is shown in FIG. 23) in the front housing 1156 of the carriage 1128 such that the cartridge 1132 may be pushed onto or pulled away from the carriage 1128. When the buttons 1192, 1196 are released, the tabs 1248, 1252 spread apart and, if the cartridge 1132 is within the front recess 1180 of the carriage 1128, engage portions of the front housing 1180 adjacent to the slots 1254 to secure the cartridge 1132 to the carriage 1128.

Figure 24:
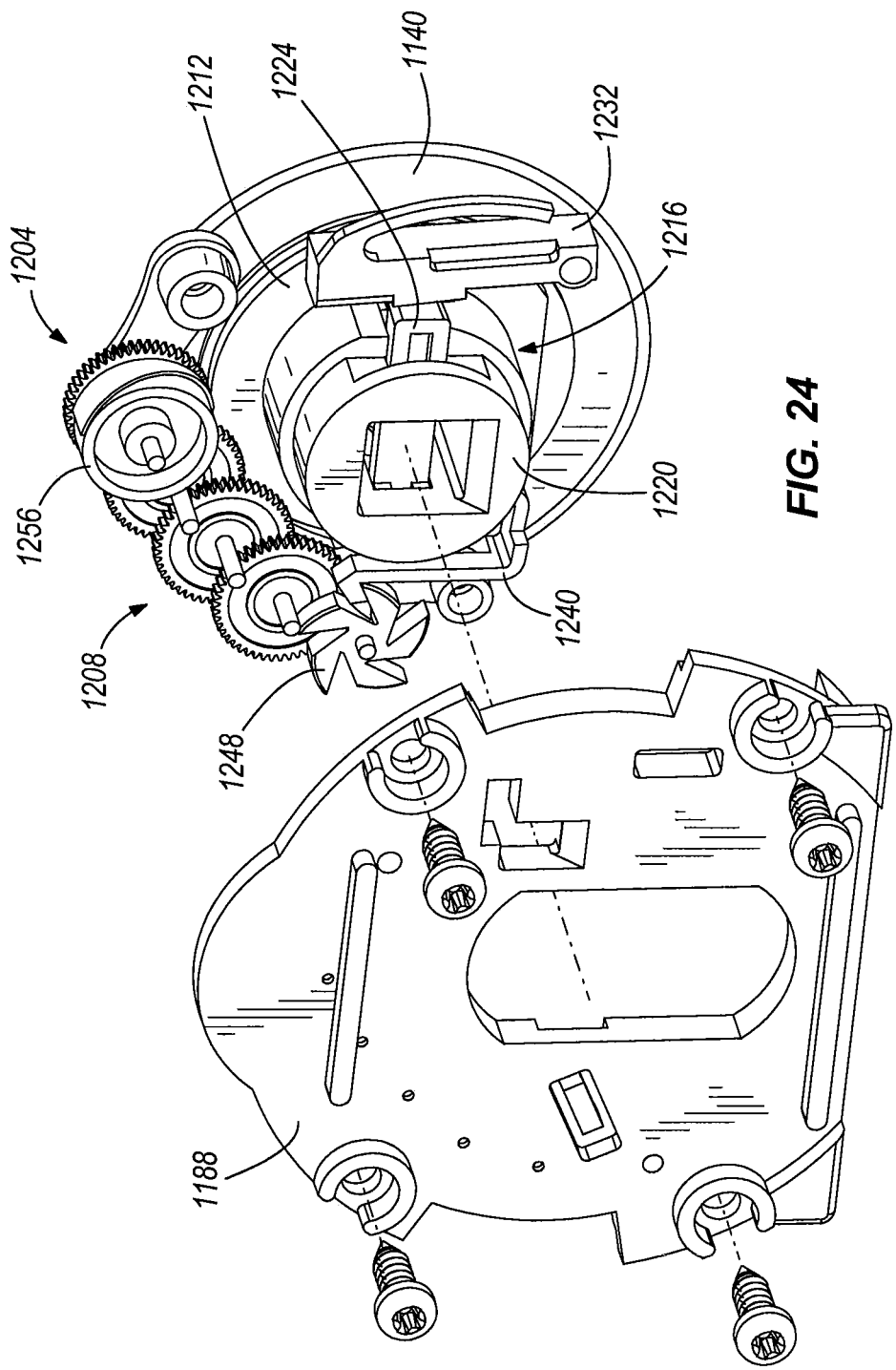
FIG. 24 is a rear perspective view of a portion of the cartridge shown in FIG. 22.
Figure 25:
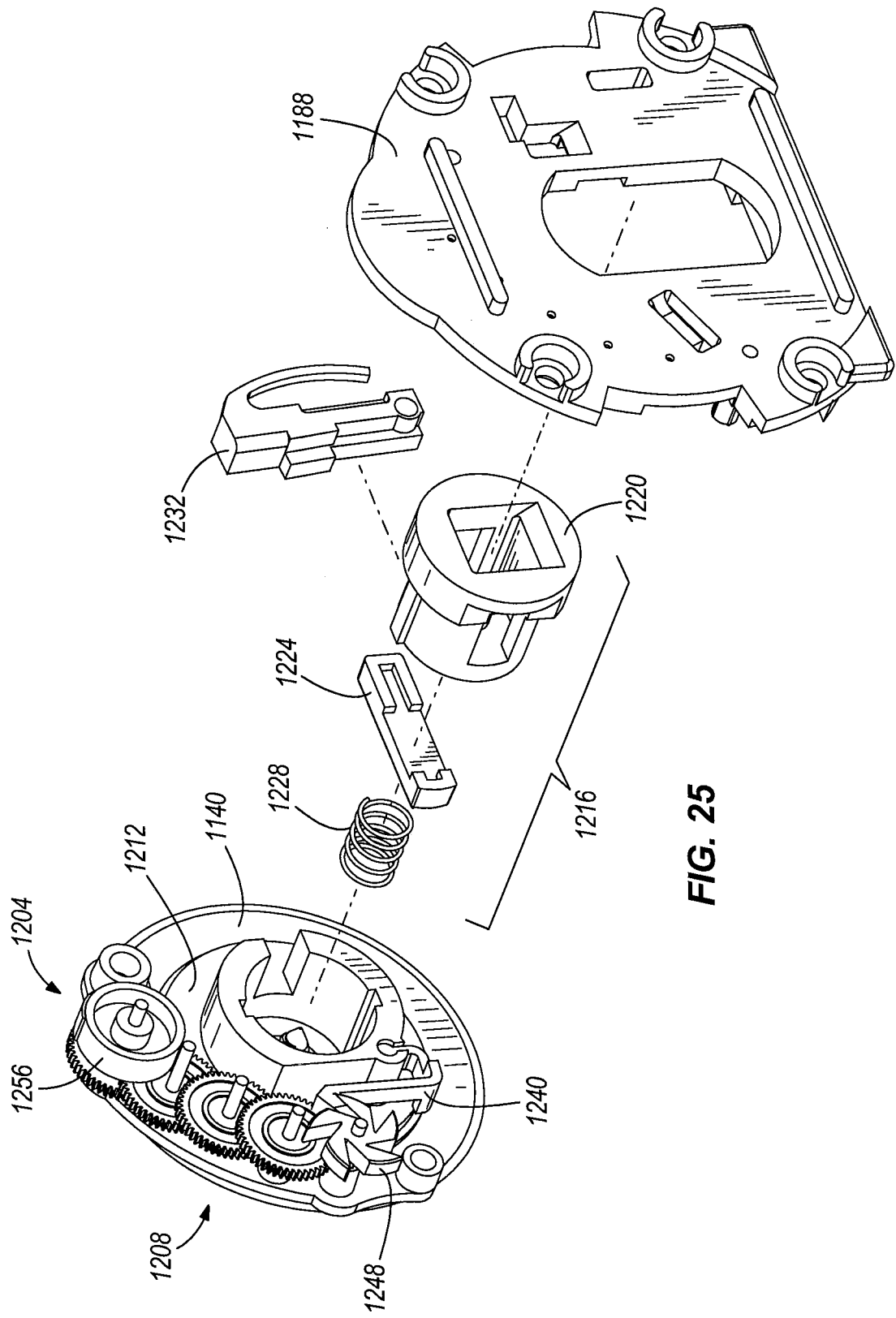
FIG. 25 is an exploded rear perspective view of the portion of the cartridge shown in FIG. 24.

Referring to FIGS. 24 and 25, the cartridge 1132 also includes a gear train 1208 coupled between the blade 1140 and the rear housing 1188, a blade carrier 1212, and a blade release mechanism 1216. Similar to the embodiment shown in FIGS. 12 and 13, the blade release mechanism 1216 includes a guide member 1220, a bar 1224, a biasing element 1228, and a hooked member 1232. The hooked member 1232 engages a projection (not shown) on the rear housing 1188 to lock the blade carrier 1212 and the blade 1140 relative to the rear housing 1188. The biasing element 1228 pushes against the bar 1224 to bias the hooked member 1232 into this engagement. In the illustrated embodiment, the biasing element 1228 is a coil spring. The post 1148 of the actuator 1136 extends into the guide member 1220 to push the bar 1224 away from the rear housing 1188. The hooked member 1232 thereby no longer engages the projection (not shown) on the rear housing 1188, unlocking the blade carrier 1212 and the blade 1140 from the rear housing 1188 such that the blade 1140 can extend from the bottom of the cartridge 1132.

Similar to the embodiment shown in FIGS. 12 and 13, the blade carrier 1212 includes a finger 1240. The finger 1240 engages a first gear 1248 of the gear train 1208 such that, when the blade carrier 1212 moves downwardly to extend the blade 1140 from the cartridge 1132, the finger 1240 rotates the first gear 1248. Rotation of the first gear 1248 is transmitted through the gear train 1208 to update the blade wear or usable life status of the indicator 1204 (e.g., of an annular disc 1256 of the indicator 1204).

Figure 26:
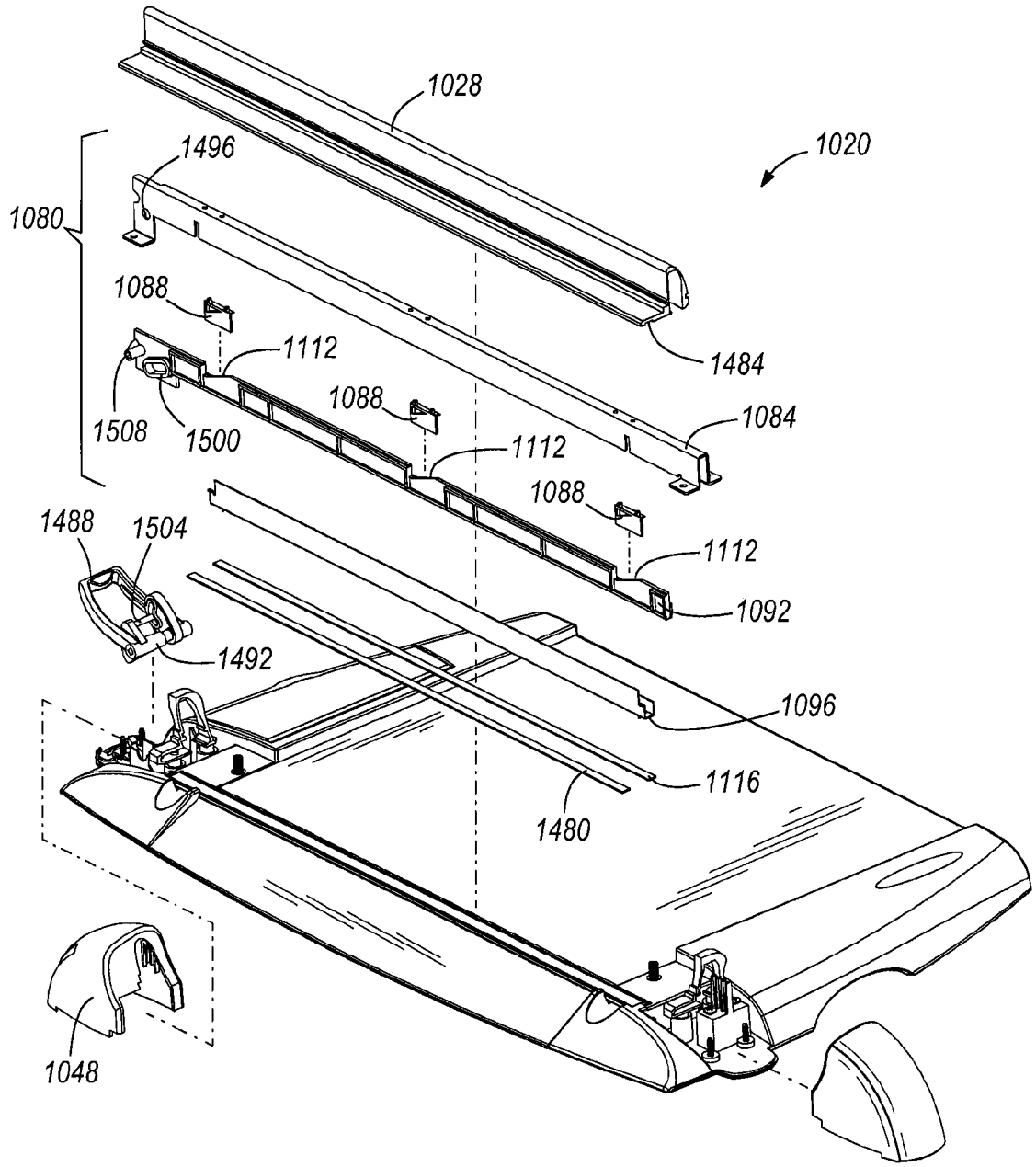
FIG. 26 is an exploded view of the rotary trimmer shown in FIG. 19.

As shown in FIG. 26, the trimmer 1020 includes a clamp assembly 1080 positioned within the rail 1028. The illustrated clamp assembly 1080 includes a clamp beam 1084, three clamp wedges 1088, a clamp ramp plate 1092, and a clamp bar 1096. Similar to the embodiment of FIGS. 7A-8D, the clamp ramp plate 1092, or second clamping member, is positioned within the clamp beam 1084 adjacent to the clamp wedges 1088. The clamp ramp plate 1092 includes three triangular notches 1112 corresponding to angled surfaces of the clamp wedges 1088. The clamp bar 1096, or first clamping member, is positioned beneath the clamp ramp plate 1092 and partially surrounds the clamp ramp plate 1092. A first resilient strip 1116 composed of a resilient material (e.g., foam, rubber, or the like) is positioned on a bottom of the clamp bar 1096 to facilitate gripping of the paper and to help take up slack during clamping with the clamp assembly 1080 (i.e., the manual clamping mode). In the illustrated embodiment, a second resilient strip 1480 is positioned within a recess 1484 in the rail 1028 to facilitate gripping and to take up slack during clamping with the rail 1028 (i.e., the automatic clamping mode).

Figure 27A:
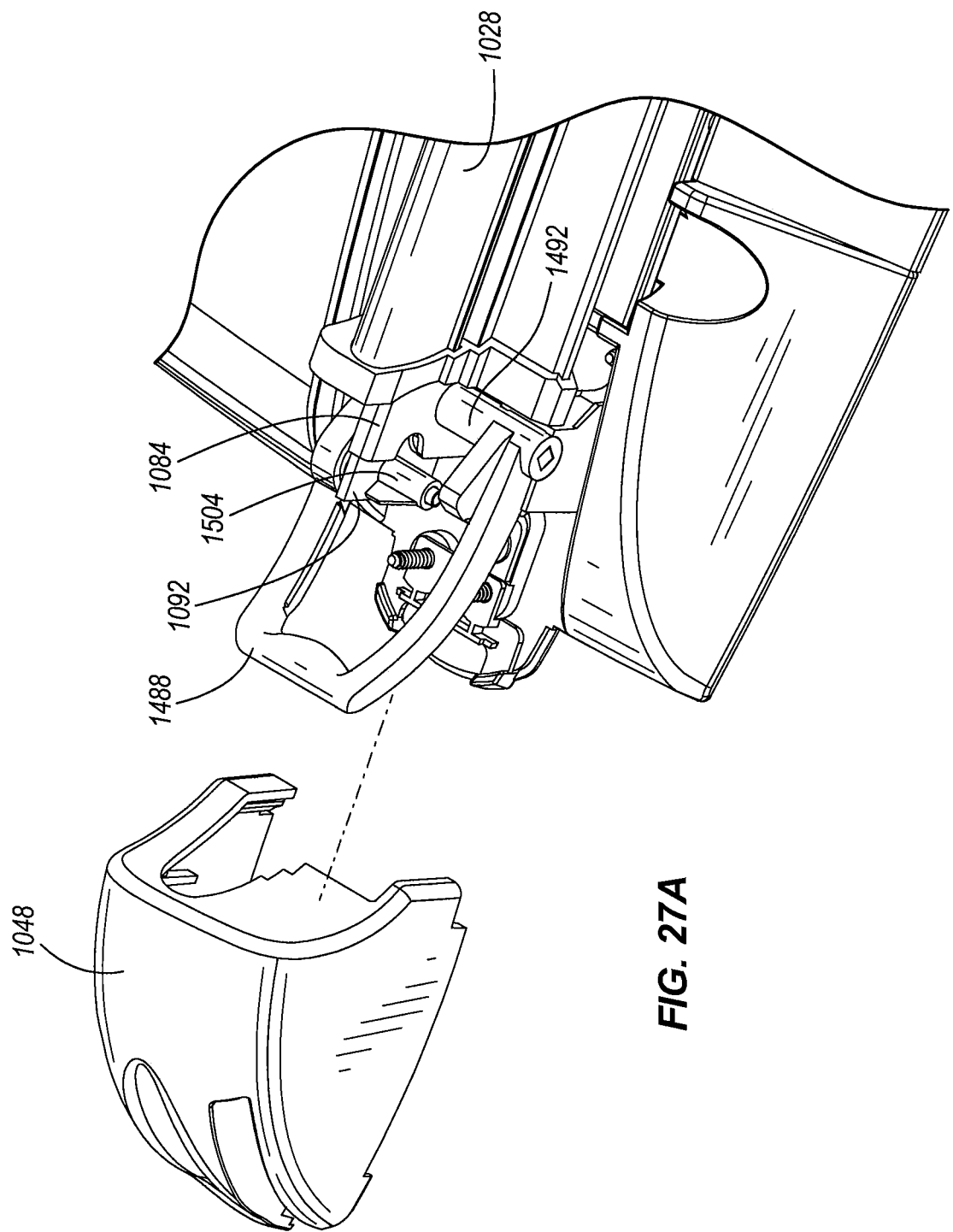
FIG. 27A is an enlarged perspective view of a portion of the rotary trimmer shown in FIG. 19.
Figure 27B:
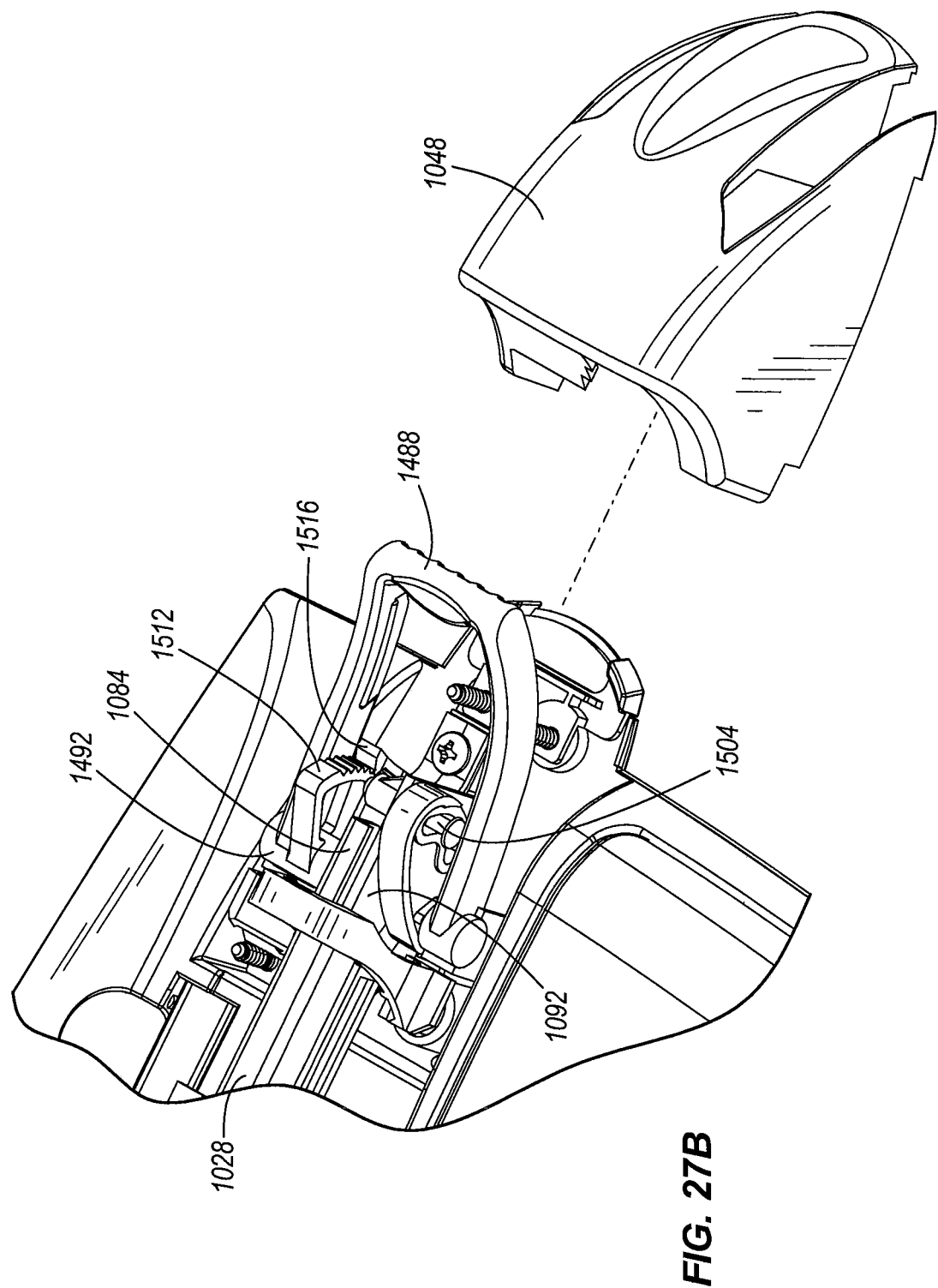
FIG. 27B is another enlarged perspective view of the portion of the rotary trimmer shown in FIG. 27A.

The clamp ramp plate 1092 is attached to an actuator 1488, or lever, extending out of a first support 1048. The actuator 1488 includes a first rod 1492 extending through a hole 1496 in the clamp beam 10,84 and a clearance slot 1500 in the clamp ramp plate 1092, and a second rod 1504 extending through an opening 1508 in the clamp ramp plate 1092. Referring to FIGS. 27A and 27B, when actuated, the actuator 1488 rotates about the first rod 1492 such that the second rod 1504 pulls the clamp ramp plate 1092 horizontally. When the clamp ramp plate 1092 translates horizontally, the notches 1112 ramp against the clamp wedges 1088, causing the clamp ramp plate 1092 to move downward and push the clamp bar 1096 and the foam strip 1116 toward the base 1024 to clamp paper (similar to the motion depicted between FIGS. 8A and 8C). As shown in FIG. 27B, the actuator 1488 also includes a toothed member 1512 and the base 1024 includes a hooked member 1516 that engages the toothed member 1512 in a ratchet-like manner to releasably secure the actuator 1488 in different actuated positions.

Various features and advantages of the invention are set forth in the following claims.

What is claimed is:

1. A trimmer operable to cut at least one sheet, the trimmer comprising:
   a base configured to support the at least one sheet;
   a rail extending across at least a portion of the base;
   a cutting assembly including a carriage slidably coupled to the rail and a blade positioned on the carriage;
   a blade opposing member coupled to the base adjacent to the rail; and
   an indicator that displays a usable life status of at least one of the blade and the blade opposing member;
   wherein the cutting assembly includes a housing, and wherein the blade is movable between a first position in which the blade is positioned entirely within the housing, and a second position in which a portion of the blade extends from the housing; and
   wherein the indicator is operable to register usage in response to moving the blade to the second position.

2. The trimmer of claim 1, wherein the indicator is positioned on the cutting assembly.

3. The trimmer of claim 1, wherein the usable life status notifies a user to replace the blade.

4. The trimmer of claim 1, wherein the cutting assembly includes a cartridge detachably coupled to the carriage, and wherein the blade is positioned at least partially within the cartridge.

5. The trimmer of claim 4, wherein the indicator is positioned on the cartridge.

6. The trimmer of claim 5, wherein the cartridge includes a window, and wherein at least a portion of the indicator is visible through the window.

7. The trimmer of claim 1, wherein the blade is biased to the first position, and wherein the cutting assembly includes an actuator operable to move the blade to the second position.

8. The trimmer of claim 7, wherein the indicator includes a disc and a gear train coupled between the actuator and the disc, and wherein the usage is registered by actuating the actuator which activates the gear train to rotate the disc.

9. The trimmer of claim 1, wherein the blade opposing member is a cutting mat removably coupled to the base, and wherein the usable life status notifies a user to replace the cutting mat.

10. The trimmer of claim 1, wherein the blade opposing member includes a first mat portion and a second mat portion positioned on opposite sides of the blade opposing member, and wherein the blade opposing member is reversible from a first position, in which the blade engages the first mat portion, to a second position, in which the blade engages the second mat portion.

11. The trimmer of claim 10, wherein the blade opposing member includes a substrate positioned substantially between the first mat portion and the second mat portion to separate the first and second mat portions.

12. The trimmer of claim 1, wherein the indicator changes from a first condition, indicative of remaining usable life, to a second condition, indicative of recommended replacement.

13. A trimmer operable to cut at least one sheet, the trimmer comprising:
   a base configured to support the at least one sheet;
   a rail extending across at least a portion of the base;
   a cutting assembly including a carriage slidably coupled to the rail and a blade positioned on the carriage;
   a blade opposing member coupled to the base adjacent to the rail; and
   an indicator operable to display a usable life status of at least one of the blade and the blade opposing member;
   wherein the cutting assembly includes a housing, and wherein the blade is movable between a first position in which the blade is positioned entirely within the housing, and a second position in which a portion of the blade extends from the housing;
   wherein the blade is biased to the first position;
   wherein the cutting assembly includes an actuator operable to move the blade to the second position;
   wherein the indicator includes a disc and a gear train coupled between the actuator and the disc; and
   wherein actuating the actuator activates the gear train to rotate the disc.

14. The trimmer of claim 13, wherein the indicator is positioned on the cutting assembly.

15. The trimmer of claim 13, wherein the usable life status notifies a user to replace the blade.

16. The trimmer of claim 13, wherein the cutting assembly includes a cartridge detachably coupled to the carriage, and wherein the blade is positioned at least partially within the cartridge.

17. The trimmer of claim 16, wherein the indicator is positioned on the cartridge.

18. The trimmer of claim 17, wherein the cartridge includes a window, and wherein at least a portion of the indicator is visible through the window.

19. The trimmer of claim 13, wherein the blade opposing member is a cutting mat removably coupled to the base, and wherein the usable life status notifies a user to replace the cutting mat.

20. The trimmer of claim 13, wherein the blade opposing member includes a first mat portion and a second mat portion positioned on opposite sides of the blade opposing member, and wherein the blade opposing member is reversible from a first position, in which the blade engages the first mat portion, to a second position, in which the blade engages the second mat portion.

21. The trimmer of claim 20, wherein the blade opposing member includes a substrate positioned substantially between the first mat portion and the second mat portion to separate the first and second mat portions.

22. The trimmer of claim 13, wherein the indicator changes from a first condition, indicative of remaining usable life, to a second condition, indicative of recommended replacement.

* * * * *